US012628018B2

(12) United States Patent
Jung et al.

(10) Patent No.: US 12,628,018 B2
(45) Date of Patent: May 12, 2026

(54) METHOD AND APPARATUS FOR TRANSMITTING AND RECEIVING DATA IN WIRELESS COMMUNICATION SYSTEM

(71) Applicant: Samsung Electronics Co., Ltd., Suwon-si (KR)

(72) Inventors: Sangyeob Jung, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 473 days.

(21) Appl. No.: 17/918,452

(22) PCT Filed: Apr. 8, 2021

(86) PCT No.: PCT/KR2021/004428
§ 371 (c)(1),
(2) Date: Oct. 12, 2022

(87) PCT Pub. No.: WO2021/210846
PCT Pub. Date: Oct. 21, 2021

(65) Prior Publication Data
US 2023/0308918 A1 Sep. 28, 2023

(30) Foreign Application Priority Data
Apr. 13, 2020 (KR) ........................ 10-2020-0044786

(51) Int. Cl.
*H04W 24/10* (2009.01)
*H04W 8/24* (2009.01)
(Continued)

(52) U.S. Cl.
CPC ............. *H04W 24/10* (2013.01); *H04W 8/24* (2013.01); *H04W 48/08* (2013.01); *H04W 48/16* (2013.01); *H04W 72/51* (2023.01)

(58) Field of Classification Search
CPC ....... H04W 24/10; H04W 8/24; H04W 48/08; H04W 48/16; H04W 72/51; H04W 84/105; H04W 48/12; H04W 76/27
See application file for complete search history.

(56) References Cited

U.S. PATENT DOCUMENTS

2014/0112180 A1    4/2014 Axmon et al.
2016/0219475 A1*   7/2016 Kim ..................... H04W 76/19
(Continued)

FOREIGN PATENT DOCUMENTS

KR    10-2021-0044104 A    4/2021

OTHER PUBLICATIONS

3GPP TS 38.331 V16.0.0, Mar. 2020, Radio Resource Control (RRC) protocol specification (Release 16) (Year: 2020).*
(Continued)

*Primary Examiner* — Joseph E Avellino
*Assistant Examiner* — Adam Joel Cerlanek
(74) *Attorney, Agent, or Firm* — Jefferson IP Law, LLP

(57) ABSTRACT

In a wireless communication system, a method performed by a user equipment (UE) includes transmitting, to a base station, UE capability information including an indicator indicating that the UE supports cell global identifier (CGI) information reporting, receiving, from the base station, measurement configuration information including an indicator indicating a cell to which CGI information is to be reported, obtaining a non-public network (NPN) identifier information list for the indicated cell, and transmitting, to the base station, a measurement report message including the NPN identifier information list.

16 Claims, 15 Drawing Sheets

(51) Int. Cl.

| | |
|---|---|
| *H04W 48/08* | (2009.01) |
| *H04W 48/16* | (2009.01) |
| *H04W 72/51* | (2023.01) |

(56)                  References Cited

U.S. PATENT DOCUMENTS

| | | | |
|---|---|---|---|
| 2018/0027471 A1 | 1/2018 | Zhang et al. | |
| 2018/0213454 A1* | 7/2018 | Santhanam | ....... H04W 36/0085 |
| 2023/0345351 A1* | 10/2023 | Lindheimer | .......... H04W 48/18 |

OTHER PUBLICATIONS

Ericsson, Connected mode aspects, R2-1914627, 3GPP TSG-WG2 #108, Reno, USA, Nov. 7, 2019.

Huawei et al., General considerations on connected mode for NPN, R2-2001377, 3GPP TSG-RAN WG2 Meeting #109 electronic, Feb. 14, 2020.

Extended European Search Report dated Jul. 5, 2023, issued in European Patent Application No. 21789247.0.

3GPP; TSG RAN; NR; RRC protocol specification (Release 16) , TS 38.331 V 16.0.0 dated Mar. 2020.

3GPP; TSG RAN; NR; NR and NG-RAN Overall Description; Stage 2 (Release 16), TS 38.300 V16.1.0 dated Mar. 2020.

3GPP; TSG RAN; E-UTRA; RRC; Protocol specification (Release 16), TS 36.331 V16.0.0 dated Mar. 2020.

International Search Report dated Jul. 16, 2021, issued in International Application No. PCT/KR2021/004428.

NOKIA; Report from email discussion [Post109e#18][PRN] Remaining open issues; 3GPP TSG-RAN WG2 Meeting #109bis-e; R2-2002659; XP 51870908 A; Elbonia; Apr. 20-30, 2020.

Chinese Office Action with English translation dated May 1, 2025; Chinese Appln. No. 202180028242.X.

European Communication pursuant to Article 94(3) EPC dated Jun. 16, 2025; European Appln. No. 21 789 247.0-1206.

Korean Office Action with English translation dated Feb. 3, 2026; Korean Appln. No. 10-2020-0044786.

Chinese Office Action with English translation dated Jan. 10, 2026; Chinese Appln. No. 202180028242.X.

* cited by examiner

FIG. 1H

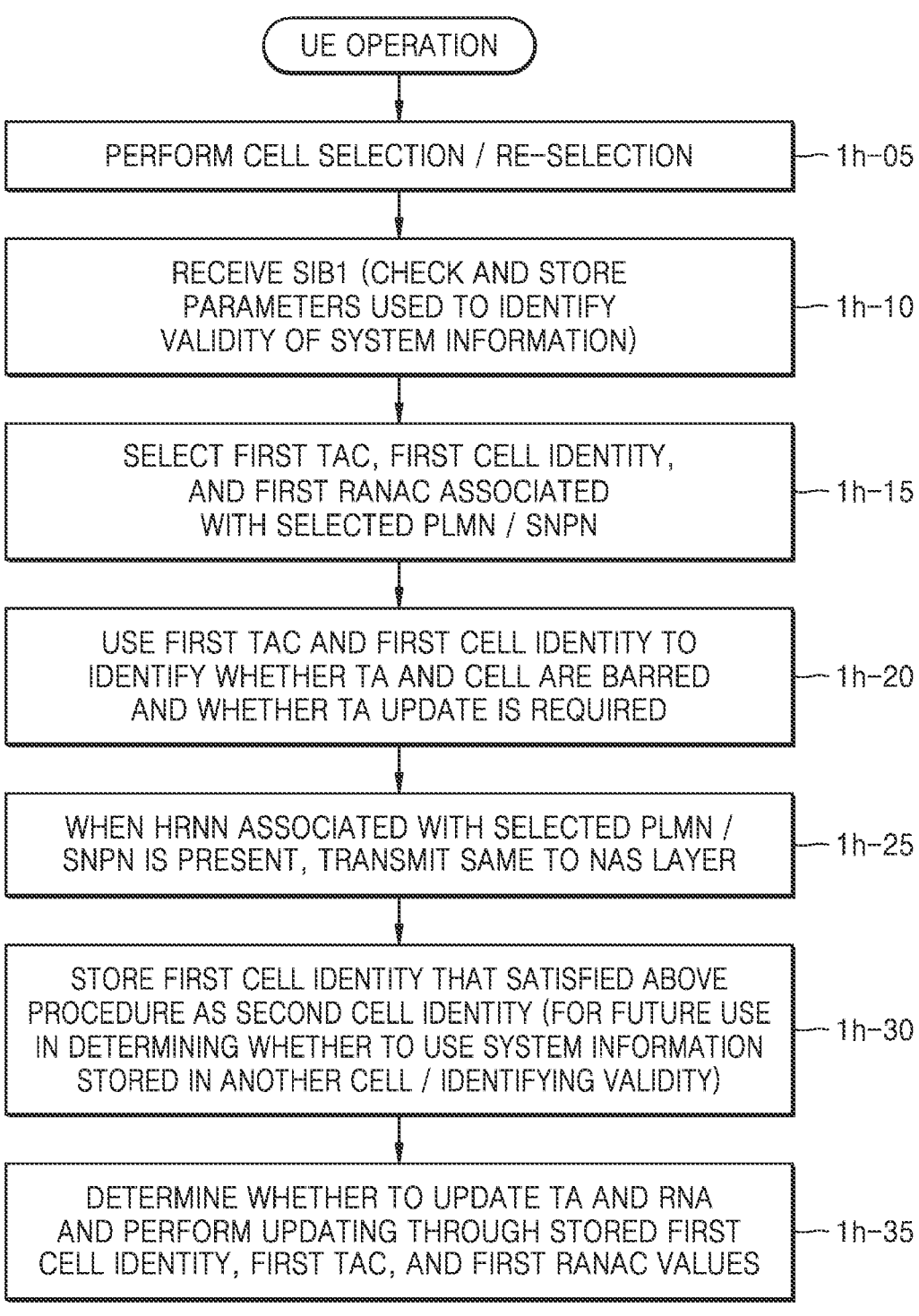

UE OPERATION

PERFORM CELL SELECTION / RE-SELECTION — 1h-05

RECEIVE SIB1 (CHECK AND STORE
PARAMETERS USED TO IDENTIFY
VALIDITY OF SYSTEM INFORMATION) — 1h-10

SELECT FIRST TAC, FIRST CELL IDENTITY,
AND FIRST RANAC ASSOCIATED
WITH SELECTED PLMN / SNPN — 1h-15

USE FIRST TAC AND FIRST CELL IDENTITY TO
IDENTIFY WHETHER TA AND CELL ARE BARRED
AND WHETHER TA UPDATE IS REQUIRED — 1h-20

WHEN HRNN ASSOCIATED WITH SELECTED PLMN /
SNPN IS PRESENT, TRANSMIT SAME TO NAS LAYER — 1h-25

STORE FIRST CELL IDENTITY THAT SATISFIED ABOVE
PROCEDURE AS SECOND CELL IDENTITY (FOR FUTURE USE
IN DETERMINING WHETHER TO USE SYSTEM INFORMATION
STORED IN ANOTHER CELL / IDENTIFYING VALIDITY) — 1h-30

DETERMINE WHETHER TO UPDATE TA AND RNA
AND PERFORM UPDATING THROUGH STORED FIRST
CELL IDENTITY, FIRST TAC, AND FIRST RANAC VALUES — 1h-35

METHOD AND APPARATUS FOR TRANSMITTING AND RECEIVING DATA IN WIRELESS COMMUNICATION SYSTEM

TECHNICAL FIELD

The disclosure relates to a method and apparatus for transmitting and receiving data in a wireless communication system.

BACKGROUND ART

To meet the increase in demand for wireless data traffic after the commercialization of 4th generation (4G) communication systems, considerable efforts have been made to develop enhanced 5G communication systems. In this regard, 5G communication systems have been referred to as beyond 4G network communication systems or post long-term evolution (LTE) systems. In order to achieve a high data rate, 5G communication systems are being developed to be implemented in a super-high frequency band (millimeter wave (mm Wave)), e.g., a band of 60 GHz. In order to reduce propagation path loss of radio waves and increase a propagation distance of radio waves in millimeter wave frequency bands, in 5G communication systems, discussions are under-way about technologies such as beamforming, massive multiple-input multiple-output (MIMO), full dimensional MIMO (FD-MIMO), array antenna, analog beamforming, and large-scale antenna. In order to improve system networks for 5G communication systems, various technologies have been developed, e.g., evolved small cells, advanced small cells, cloud radio access networks (Cloud-RAN), ultra-dense networks, device-to-device communication (D2D), wireless backhaul, moving networks, cooperative communication, coordinated multi-points (COMP), and received-interference cancellation. In addition, for 5G communication systems, advanced coding modulation (ACM) technologies such as hybrid frequency-shift keying (FSK) and quadrature amplitude modulation (QAM) (FQAM) and sliding window superposition coding (SWSC), and advanced access technologies such as filter bank multi-carrier (FBMC), non-orthogonal multiple access (NOMA), and sparse code multiple access (SCMA), have been developed.

A new radio (NR), i.e., new 5G communication, has been designed such that various services are freely multiplexed in time and frequency resources, and accordingly, waveform/numerology, a reference signal, and the like may be dynamically or freely assigned according to necessity of a corresponding service. To provide an optimum service to a terminal in communication, data transmission optimized via measurement of quality and interference of a channel is important, and thus channel state measurement is mandatory. However, unlike 4G communication in which channel and interference characteristics do not largely change depending on a frequency resource, channel and interference characteristics of a 5G channel largely change depending on a service, and thus a subset of a frequency resource group (FRG) needs to be supported to divide and measure services. In an NR system, types of supported services may be divided in categories of enhanced mobile broadband (eMBB), massive machine type communications (mMTC), and ultra-reliable and low-latency communications (URLLC). The eMBB may be a service aiming at high-speed transmission of high-capacity data, the mMTC may be a service aiming at terminal power minimization and multiple terminal connections, and the URLLC may be a service aiming at high reliability and low delay. Different requirements may be applied depending on types of services applied to the terminal.

As such, a plurality of services may be provided to a user in a communication system, and a method for providing the plurality of services according to characteristics so as to provide the plurality of services to the user and an apparatus using the method are required.

DESCRIPTION OF EMBODIMENTS

Solution to Problem

In a wireless communication system according to an embodiment of the disclosure, a method performed by a user equipment (UE) includes transmitting, to a base station, UE capability information including an indicator indicating that the UE supports cell global identifier (CGI) information reporting, receiving, from the base station, measurement configuration information including an indicator indicating a cell to which CGI information is to be reported, obtaining a non-public network (NPN) identifier information list for the indicated cell, and transmitting, to the base station, a measurement report message including the NPN identifier information list.

In a wireless communication system according to an embodiment of the disclosure, a method performed by a base station includes receiving, from a user equipment (UE), a UE capability information including an indicator indicating that the UE supports cell global identifier (CGI) information reporting, transmitting, to the UE, measurement configuration information including an indicator indicating a cell to which CGI information is to be reported, and receiving, from the UE, a measurement report message including a non-public network (NPN) identifier information list for the indicated cell.

In a wireless communication system according to an embodiment of the disclosure, a user equipment (UE) includes a transceiver and at least one processor configured to transmit, to a base station, UE capability information including an indicator indicating that the UE supports cell global identifier (CGI) information reporting, receive, from the base station, measurement configuration information including an indicator indicating a cell to which CGI information is to be reported, obtain a non-public network (NPN) identifier information list for the indicated cell, and transmit, to the base station, a measurement report message including the NPN identifier information list.

In a wireless communication system according to an embodiment of the disclosure, a base station includes a transceiver and at least one processor configured to receive, from a user equipment (UE), a UE capability information including an indicator indicating that the UE supports cell global identifier (CGI) information reporting, transmit, to the UE, measurement configuration information including an indicator indicating a cell to which CGI information is to be reported, and receive, from the UE, a measurement report message including a non-public network (NPN) identifier information list for the indicated cell.

BRIEF DESCRIPTION OF DRAWINGS

FIG. 1H is a diagram illustrating a UE operation in which a UE accesses an NPN cell, according to an embodiment of the disclosure.

FIG. 1O is a block diagram of a configuration of a base station, according to an embodiment of the disclosure.

MODE OF DISCLOSURE

Figure 1A:
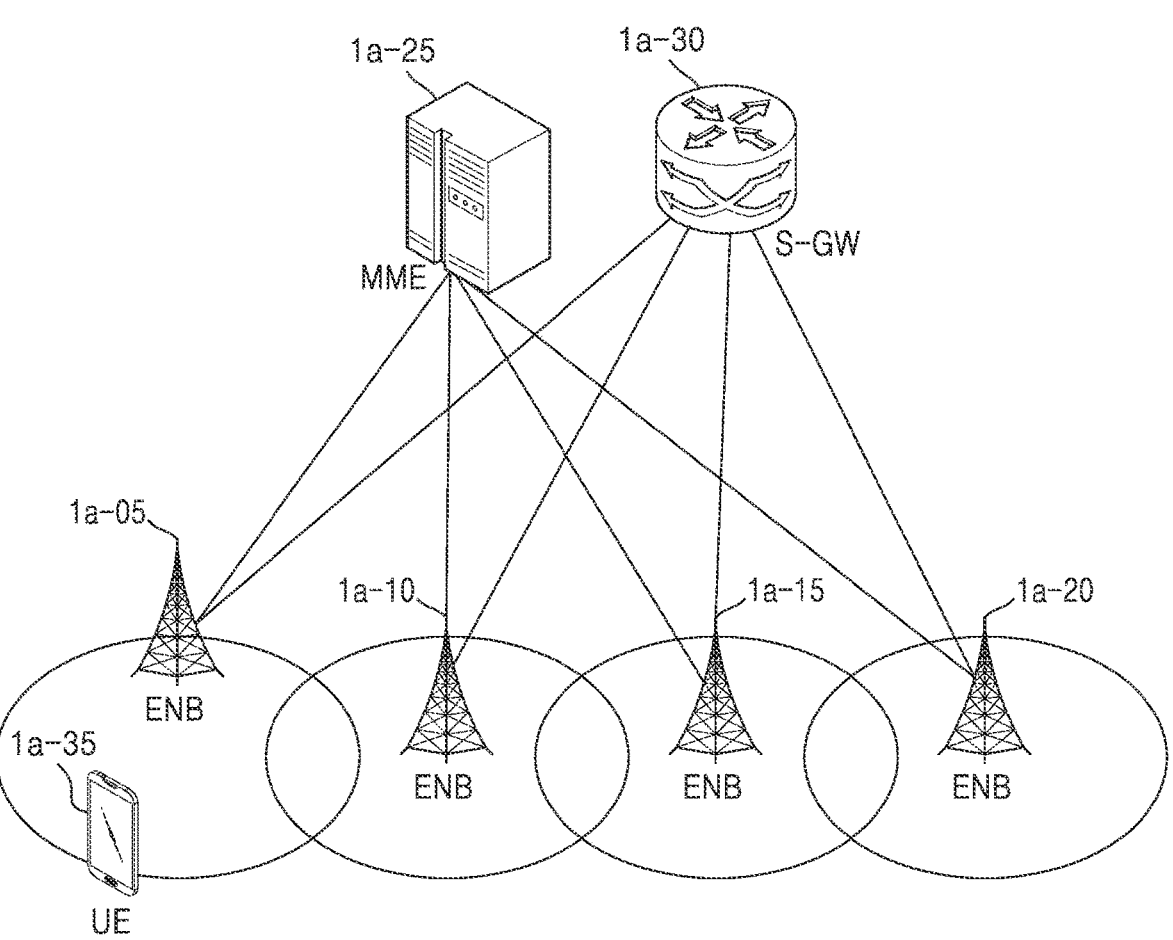
FIG. 1A is a diagram of a structure of a long-term evolution (LTE) system, which is referred to to describe the disclosure.

Hereinafter, embodiments of the disclosure will be described in detail with reference to accompanying drawings. While describing the disclosure, detailed description of related functions or configurations may be omitted when it is deemed that they may unnecessarily obscure the essence of the disclosure. Also, terms used below are defined in consideration of functions in the disclosure, and may have different meanings according to an intention of a user or operator, customs, or the like. Therefore, the terms used herein have to be defined based on the meaning of the terms together with the description throughout the specification.

Main features of the disclosure are applicable to other systems with similar technical backgrounds, with a slight change within a range that does not deviate from the scope of the disclosure, and such applicability may be determined by one or ordinary skill in the art. For reference, a communication system is a term generally including the meaning of a broadcasting system, but in the disclosure, the communication system may be further clearly referred to as a broadcasting system when a broadcasting service is a main service in the communication system.

Advantages and features of the disclosure and methods of accomplishing the same may be understood more readily by reference to the following detailed description of the embodiments and the accompanying drawings. In this regard, the embodiments of the disclosure may have different forms and should not be construed as being limited to the descriptions set forth herein. Rather, these embodiments of the disclosure are provided so that the disclosure will be thorough and complete and will fully convey the concept of the disclosure to one of ordinary skill in the art, and the disclosure will only be defined by the appended claims. Throughout the specification, like reference numerals denote like elements.

In various embodiments of the disclosure described below, a hardware approach is described as an example. However, because various embodiments of the disclosure include technology using both hardware and software, various embodiments of the disclosure do not exclude a software-based approach.

The disclosure hereinbelow relates to an apparatus and method for transmitting and receiving control information in a communication system. In particular, the disclosure describes a technology for transmitting and receiving control information based on a channel quality indicator (CQI) and modulation coding scheme (MCS) table in a wireless communication system.

In the description below, the term indicating a signal, the term indicating a channel, the term indicating control information, the term indicating a network entity, the term indicating a component of an apparatus, and the like are exemplified for convenience of descriptions. Thus, the terms used in the disclosure are not limited and other terms having the same technical meanings may be used.

Also, various embodiments of the disclosure are described by using the terms used in some communication standards (for example, 3rd generation partnership project (3GPP), but the embodiments are only examples for description. The various embodiments of the disclosure may be easily modified and applied to another communication system.

FIG. 1A is a diagram of a structure of a long-term evolution (LTE) system, which is referred to to describe the disclosure.

Referring to FIG. 1A, a radio access network of an LTE system includes next-generation base stations (evolved node Bs, hereinafter eNBs, node Bs, or base stations) 1a-05, 1a-10, 1a-15, and 1a-20, a mobility management entity (MME) 1a-25, and a serving-gateway (S-GW) 1a-30. A user equipment (UE) (or a terminal) 1a-35 accesses an external network through the eNBs 1a-05 to 1a-20 and the S-GW 1a-30.

In FIG. 1A, the eNBs 1a-05 through 1a-20 correspond to existing node Bs of a universal mobile telecommunication system (UMTS). The eNB 1a-05, 1a-10, 1a-15, or 1a-20 is connected to the UE 1a-35 through a radio channel and performs complex functions compared to the existing node B. In the LTE system, all user traffic including a real-time service, such as voice over Internet protocol (IP) (VOIP), is serviced through a shared channel, and thus an entity for collating buffer status information of UEs, available transmission power status information, channel status information, etc., and performing scheduling is required and such operations may be performed by the eNBs 1a-05 through 1a-20. One eNB generally controls a plurality of cells. For example, the LTE system may use radio access technology such as orthogonal frequency division multiplexing (OFDM) at a bandwidth of 20 MHz to achieve a data rate of 100 Mbps. Also, an adaptive modulation and coding (AMC) scheme for determining a modulation scheme and a channel coding rate is applied in accordance with a channel status of the UE 1a-35. The S-GW 1a-30 is an entity for providing data bearers and may generate or remove the data bearers according to control by the MME 1a-25. The MME 1a-25 is an entity for performing not only a mobility management function but also various control functions on the UE 1a-35, and may be connected to a plurality of base stations (the eNBs 1a-05 through 1a-20).

Figure 1B:
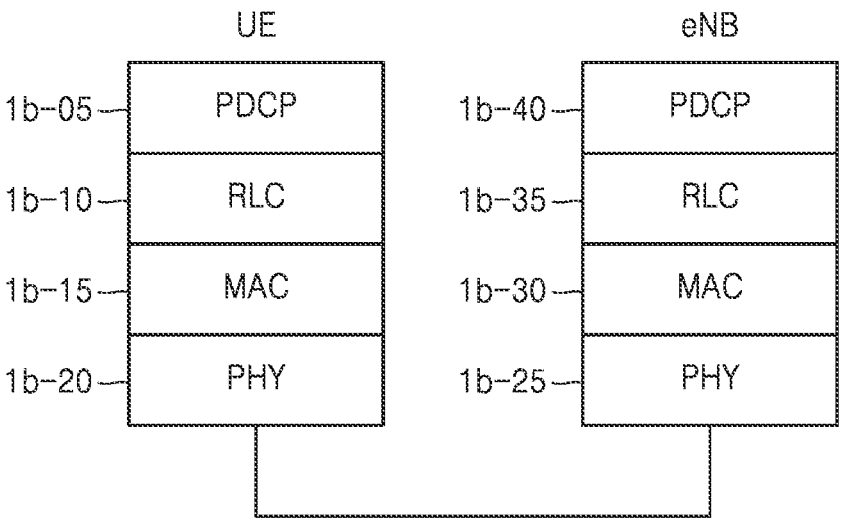
FIG. 1B is a diagram of a radio protocol architecture in an LTE system, which is referred to to describe the disclosure.

FIG. 1B is a diagram of a radio protocol architecture in an LTE system, which is referred to to describe the disclosure.

Referring to FIG. 1B, the radio protocol architecture of the LTE system may include packet data convergence protocol (PDCP) layers 1b-05 and 1b-40, radio link control (RLC) layers 1b-10 and 1b-35, and media access control (MAC) layers 1b-15 and 1b-30 respectively for a UE and an eNB. The PDCP layers 1b-05 and 1b-40 may perform operations such as internet protocol (IP) header compression/reconstruction. Main functions of the PDCP layer 1b-05 or 1b-40 are summarized as below.

Header compression and decompression: Robust header compression (ROHC) only
  Transfer of user data
  In-sequence delivery function (In-sequence delivery of upper layer protocol data units (PDUs) at PDCP re-establishment procedure for RLC acknowledged mode (AM))
  For split bearers in dual connectivity (DC) (only support for RLC AM): PDCP PDU routing for transmission and PDCP PDU reordering for reception)
  Duplicate detection of lower layer service data units (SDUs) at PDCP re-establishment procedure for RLC AM
  Retransmission of PDCP SDUs at handover and, for split bearers in DC, of PDCP PDUs at PDCP data-recovery procedure, for RLC AM
  Ciphering and deciphering
  Timer-based SDU discard in uplink The RLC layer 1b-10 or 1b-35 performs an automatic repeat request (ARQ) operation by reconfiguring PDCP PDUs to appropriate sizes. Main functions of the RLC layer 1b-10 or 1b-35 are summarized as below.

Transfer of upper layer PDUs
  Error Correction through ARQ (only for AM data transfer)
  Concatenation, segmentation, and reassembly of RLC SDUs (only for unacknowledged mode (UM) and AM data transfer)
  Re-segmentation of RLC data PDUs (only for AM data transfer)
  Reordering of RLC data PDUs (only for UM and AM data transfer)
  Duplicate detection (only for UM and AM data transfer)
  Protocol error detection (only for AM data transfer)

RLC SDU discard (only for UM and AM data transfer)
  RLC re-establishment

The MAC layer 1b-15 or 1b-30 may be connected to a plurality of RLC layers configured for one UE and may multiplex RLC PDUs into a MAC PDU and may demultiplex the RLC PDUs from the MAC PDU. Main functions of the MAC layer 1b-15 or 1b-30 are summarized as below.

Mapping between logical channels and transport channels
  Multiplexing/demultiplexing of MAC SDUs belonging to one or different logical channels into/from transport blocks (TBs) delivered to/from the physical layer on transport channels
  Scheduling information reporting
  Error correction through hybrid automatic repeat request (HARQ)
  Priority handling between logical channels of one UE
  Priority handling between UEs by means of dynamic scheduling
  Multimedia broadcast multicast service (MBMS) identification
  Transport format selection
Padding PHY layer 1b-20 or 1b-25 may channel-code and modulate higher layer data into OFDM symbols and transmit the OFDM symbols through a radio channel, or demodulate OFDM symbols received through a radio channel and channel-decode and deliver the OFDM symbols to a higher layer. The PHY layer 1b-20 or 1b-25 also uses HARQ for additional error correction, and a reception end transmits information about reception of a packet transmitted from a transmission end in one bit. This is referred to as HARQ acknowledgement (ACK)/non-acknowledgement (NACK) information. Downlink HARQ ACK/NACK information regarding uplink transmission may be transmitted via a physical HARQ indicator channel (PHICH), and uplink HARQ ACK/NACK information regarding downlink transmission may be transmitted via a physical uplink control channel (PUCCH) or a physical uplink shared channel (PUSCH).

The PHY layers 1b-20 and 1b-25 may include one or more frequencies/carriers. A technology for simultaneously configuring and using a plurality of frequencies is referred to as carrier aggregation (CA). According to the CA technology, a transmission amount may be dramatically increased by the number of subcarriers, by using a main carrier and one or a plurality of subcarriers instead of one carrier, for communication between a terminal (or a UE) and a base station (E-UTRAN node B or eNB). In the LTE system, a cell in the eNB using a main carrier is referred to as a primary cell (Pcell), and a cell in the eNB using a subcarrier is referred to as a secondary cell (Scell).

Although not illustrated, an RRC layer is present in each of higher layers of PDCP layers 1b-05 and 1b-40 of the UE and the eNB, and may exchange access and measurement-related configuration control messages for RRC.

Figure 1C:
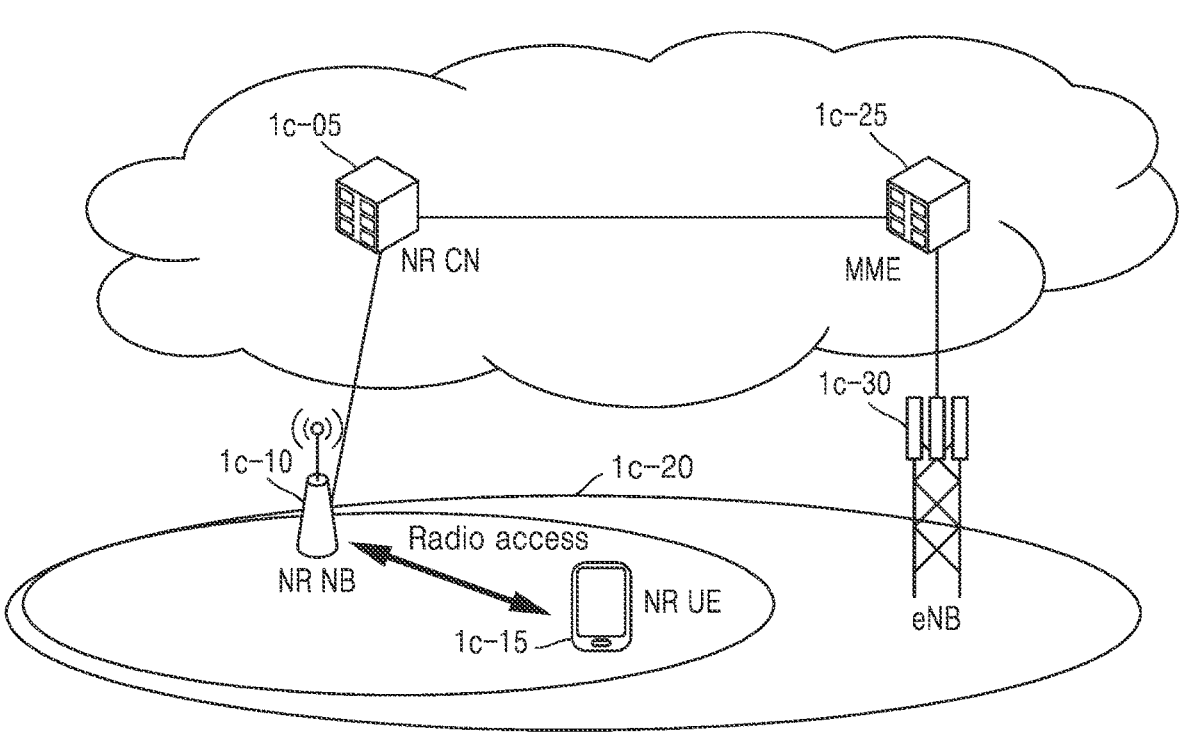
FIG. 1C is a diagram of a structure of a next-generation mobile communication system to which the disclosure is applied.

FIG. 1C is a diagram of a structure of a next-generation mobile communication system to which the disclosure is applied.

Referring to FIG. 1C, as illustrated, a radio access network of the next-generation mobile communication system may include an NR node B (NB) 1c-10 and an NR core network (CN) or next generation (NG) CN 1c-05. A new radio user equipment (NR UE) or terminal 1c-15 may access an external network via the NR NB 1c-10 and the NR CN 1c-05.

In FIG. 1C, the NR NB 1c-10 corresponds to an eNB of an existing LTE system. The NR NB 1c-10 is connected to the NR UE 1c-15 through a radio channel and may provide a superior service compared to an existing NB. Because all user traffic data is serviced through shared channels in the next-generation mobile communication system, an entity for collating buffer status information of UEs, available transmission power status information, channel status information, etc. and performing scheduling is required and such operations may be performed by the NR NB 1c-10. One NR NB 1c-10 may generally control a plurality of cells. An existing maximum bandwidth or more may be provided to implement high-speed data transmission compared to existing LTE, and OFDM may be used as a radio access technology to be additionally applied to a beamforming technology. Also, an adaptive modulation and coding (AMC) scheme for determining a modulation scheme and a channel coding rate is applied in accordance with a channel status of a UE. The NR CN 1c-05 performs functions including mobility support, bearer configuration, and quality of service (QoS) configuration. The NR CN 1c-05 is an entity for performing a mobility management function and various control functions for the UE and may be connected to a plurality of base stations. The next-generation mobile communication system may cooperate with the existing LTE system, and the NR CN 1c-05 is connected to an MME 1c-25 through a network interface. The MME 1c-25 is connected to an eNB 1c-30 that is an existing base station.

Figure 1D:
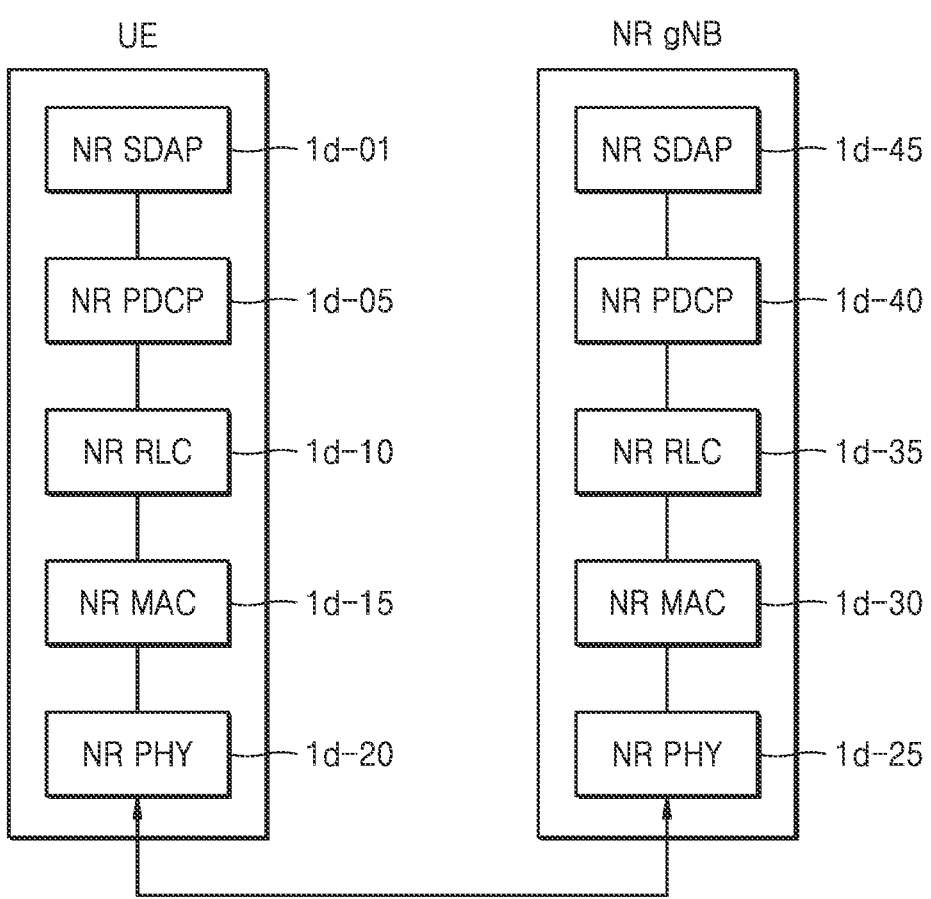
FIG. 1D is a diagram of a radio protocol architecture of a next-generation mobile communication system to which the disclosure is applicable.

FIG. 1D is a diagram of a radio protocol architecture of a next-generation mobile communication system to which the disclosure is applicable.

Referring to FIG. 1D, the radio protocol architecture of the next-generation mobile communication system may include NR service data adaptation protocol (SDAP) layers 1d-01 and 1d-45, NR PDCP layers 1d-05 and 1d-40, NR RLC layers 1d-10 and 1d-35, and NR MAC layers 1d-15 and 1d-30 respectively for a UE and an NR base station. Main functions of the NR SDAP layer 1d-01 or 1d-45 may include some of the following functions.

Transfer of user plane data
Mapping between QoS flow and data radio bearer (DRB) for both downlink (DL) and uplink (UL)
Marking QoS flow ID in both DL and UL packets
Reflective QoS flow to DRB mapping for UL SDAP PDUs Regarding the SDAP layer 1d-01 or 1d-45, the UE may be configured with, by an RRC message, whether to use a header of the SDAP layer 1d-01 or 1d-45 or whether to use a function of the SDAP layer 1d-01 or 1d-45 for each PDCP layer 1d-05 or 1d-40, for each bearer, or for each logical channel, and when an SDAP header is configured, a non-access stratum (NAS) reflective QoS configuration 1-bit indicator and access stratum (AS) reflective QoS configuration 1-bit indicator of the SDAP header may indicate the UE to update or reconfigure mapping information between a QoS flow and a data bearer for UL and DL. The SDAP header may include QoS flow ID indicating QoS. QoS information may be used as data processing priority information, scheduling information, or the like for supporting a seamless service.

Main functions of the NR PDCP layer 1d-05 or 1d-40 may include some of the following functions.

Header compression and decompression: ROHC only
Transfer of user data
In-sequence delivery of upper layer PDUs
Out-of-sequence delivery of upper layer PDUs
PDCP PDU reordering for reception
Duplicate detection of lower layer SDUs
Retransmission of PDCP SDUs

8

Ciphering and deciphering
Timer-based SDU discard in uplink

Reordering of the NR PDCP layer 1d-05 or 1d-40 may denote a function of reordering PDCP PDUs received from a lower layer, based on a PDCP sequence number (SN), and may include a function of delivering data to a higher layer in a reordered order. Alternatively, the reordering may include a function of immediately delivering the data without considering an order, a function of recording missing PDCP PDUs by reordering the order, a function of reporting a status regarding the missing PDCP PDUs to a transmitter, and a function of requesting to retransmit the missing PDCP PDUs.

The main functions of the NR RLC layer 1d-10 or 1d-35 may include some of the following functions.

Transfer of upper layer PDUs
In-sequence delivery of upper layer PDUs
Out-of-sequence delivery of upper layer PDUs
Error correction through ARQ
Concatenation, segmentation and reassembly of RLC SDUs
Re-segmentation of RLC data PDUs
Reordering of RLC data PDUs
Duplicate detection
Protocol error detection
RLC SDU discard
RLC re-establishment The in-sequence delivery of the NR RLC layer 1d-10 or 1d-35 may denote a function of delivering RLC SDUs received from a lower layer, to a higher layer in order. The in-sequence delivery may include a function of reassembling RLC SDUs segmented from an RLC SDU and delivering the RLC SDUs when the segmented RLC SDUs are received, a function of reordering received RLC PDUs on an RLC SN or PDCP SN basis, a function of recording missing RLC PDUs by reordering the order, a function of reporting a status of the missing RLC PDUs to a transmitter, and a function of requesting to retransmit the missing RLC PDUs. The in-sequence delivery may include a function of delivering only RLC SDUs previous to a missing RLC SDU, to a higher layer in order, when the missing RLC SDU exists, a function of delivering all RLC SDUs received before a timer is started, to a higher layer in order, even when a missing RLC SDU exists, when a certain timer expires, or a function of delivering all RLC SDUs currently received to the higher layer in order, when a certain timer expires despite of a missing RLC SDU. Further, the RLC PDUs may be processed in order of reception (in order of arrival regardless of sequence numbers) and delivered to the PDCP layer 1d-05 or 1d-40 out of order (out-of sequence delivery), and segments to be received or stored in a buffer may be reassembled into a whole RLC PDU, processed, and delivered to the PDCP layer 1d-05 or 1d-40. The NR RLC layer 1d-10 or 1d-35 may not have a concatenation function, and the concatenation function may be performed by the NR MAC layer 1d-15 or 1d-30 or be replaced with a multiplexing function of the NR MAC layer 1d-15 or 1d-30.

The out-of-sequence delivery of the NR RLC layer 1d-10 or 1d-35 denotes a function of delivering RLC SDUs received from a lower layer immediately to a higher layer regardless of order, and may include a function of reassembling and delivering segmented and received RLC SDUs when one RLC SDU is segmented into several RLC SDUs, and a function of recording missing RLC PDUs by storing RLC SN or PDCP SN and reordering received RLC PDUs.

The NR MAC layer 1d-15 or 1d-30 may be connected to multiple NR RLC layers 1d-10 or 1d-35 configured for a single UE, and main functions of the NR MAC layer 1d-15 or 1d-30 may include some of the following functions.

Mapping between logical channels and transport channels

Multiplexing/demultiplexing of MAC SDUs

Scheduling information reporting

Error correction through HARQ

Priority handling between logical channels of one UE

Priority handling between UEs by means of dynamic scheduling

MBMS identification

Transport format selection

Padding

NR PHY layer 1d-20 or 1d-25 may channel-code and modulate higher layer data into OFDM symbols and transmit the OFDM symbols through a radio channel, or demodulate OFDM symbols received through a radio channel and channel-decode and deliver the OFDM symbols to a higher layer.

Figure 1E:
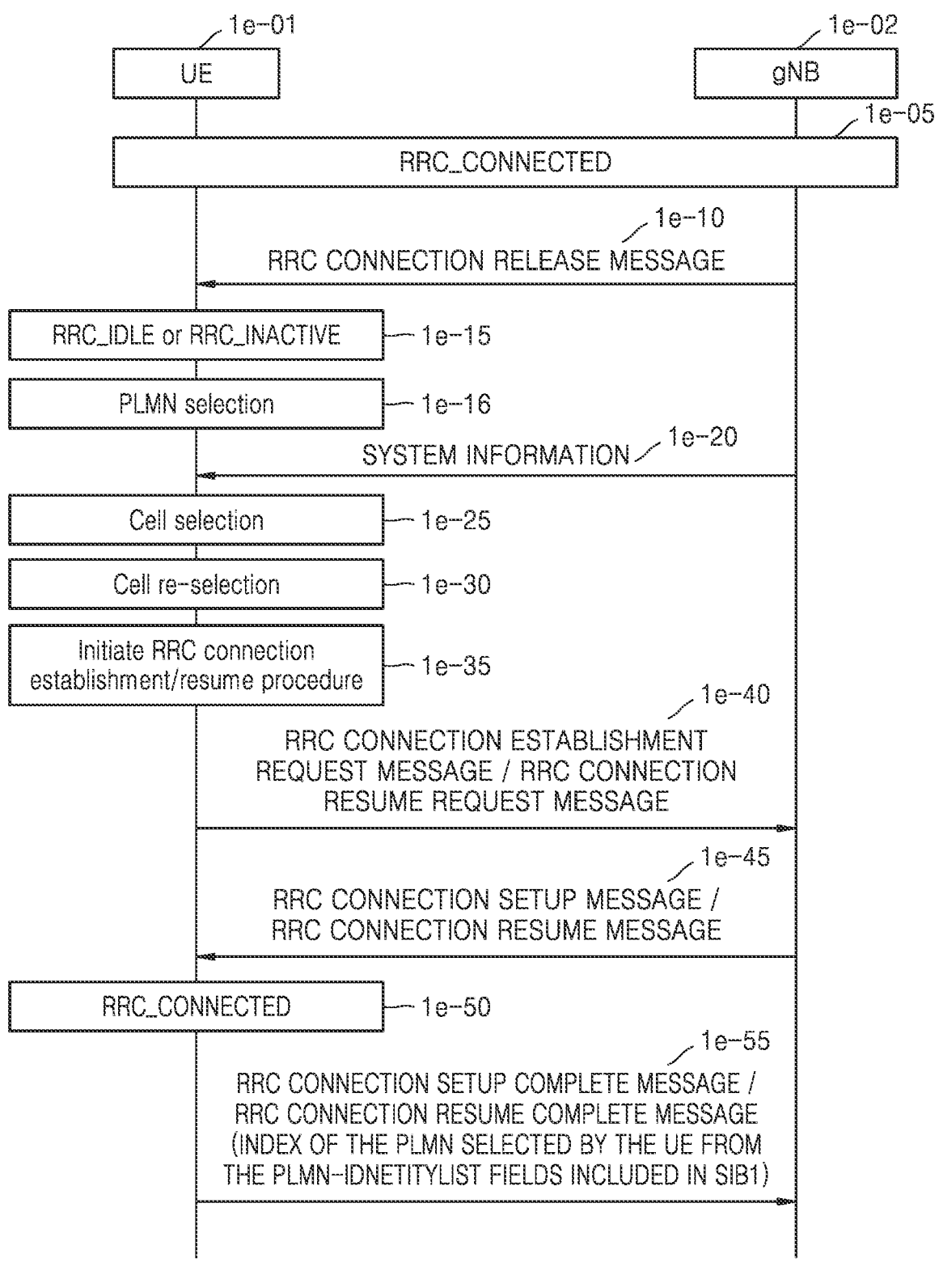
FIG. 1E is a diagram for describing a procedure, performed by a user equipment (UE) in a radio resource control (RRC) inactive mode (RRC_INACTIVE) or an RRC idle mode (RRC_IDLE), of establishing an RRC connection with a base station through regular access, in a next-generation mobile communication system, according to an embodiment of the disclosure.

FIG. 1E is a diagram for describing a procedure, performed by a UE in a radio resource control (RRC) inactive mode (RRC_INACTIVE) or an RRC idle mode (RRC_IDLE), of establishing an RRC connection with a base station through regular access, in a next-generation mobile communication system, according to an embodiment of the disclosure.

Regular access according to an embodiment of the disclosure may mean that a UE establishes an RRC connection with a base station through a public network to receive a normal service (for public use on a suitable cell). Specifically, the UE may determine that regular access to a suitable cell is possible when the following conditions for accessing the suitable cell are satisfied.

Condition 1: A cell is a part of either a selected public land mobile network (PLMN), a registered PLMN, or a PLMN of an equivalent PLMN list.

Condition 2: A cell satisfies cell selection criteria.

→The cell selection criteria may denote Equation 1 below.

$$\text{Srxlev} > 0 \text{ AND Squal} > 0 \qquad \text{Equation 1}$$

where:

Srxlev=Qrxlevmeas−(Qrxlevmin+Qrxlevminoffset)− Pcompensation Qoffsettemp

Squal=Qqualmeas−(Qqualmin+Qqualminoffset)− Qoffsettemp

For the definitions of parameters used in Equation 1, refer to 3GPP standard specification "38.304: User Equipment (UE) procedures in idle mode." The parameters may be included in system information (e.g., SIB1 or SIB2) broadcast by the cell. Hereinafter, contents of the 3GPP standard specification may be equally applied to embodiments of the disclosure to which Equation 1 is applied.

Condition 3: A cell is not barred according to information that is most recently provided from a non-access stratum (NAS) layer, and the cell is a part of at least one tracking area (TA) that is not a part of a list of "forbidden tracking areas" which belongs to a PLMN that fulfils Condition 1 above.

→The cell is barred when, for example, a "cellBarred" indicator is set to "barred" in at least MIB, a "cellReservedForOperatorUse" indicator is set to "reserved" in SIB1, or a "cellReservedForOtherUse" is set to "true".

Referring to FIG. 1E, a UE 1e-01 may establish an RRC connection with a base station (e.g., gNB) 1e-02 and thus be in an RRC connected mode (RRC_CONNECTED), in operation 1e-05.

When there is no data transmission or reception for a certain reason or for a certain time, the base station 1e-02 may transmit an RRC connection release message (RRCRelease) to the UE 1e-01 (operation 1e-10). When suspend configuration information (suspendConfig) is included in the RRC connection release message, the UE 1e-01 may transition to an RRC inactive mode, and when the suspend configuration information is not included, the UE 1e-01 may transition to an RRC idle mode (operation 1e-15).

The UE 1e-01 that has transitioned to the RRC idle mode or the RRC inactive mode may select a PLMN (1e-16). An AS layer of the UE 1e-01 may report at least one available PLMN to an NAS layer according to a request from the NAS layer or autonomously (In the UE, the AS shall report available PLMNs to the NAS on request from the NAS or automatically). During a PLMN selection procedure, based on a list of PLMN identities in priority order, a particular PLMN may be selected automatically or manually (During PLMN selection, based on the list of PLMN identities in priority order, the particular PLMN may be selected either automatically or manually). Each PLMN in the list of PLMN identifies may be identified through a 'PLMN identity.' (Each PLMN in the list of PLMN identities is identified by a 'PLMN identity').

In system information SIB1 signaled through a broadcast channel, the UE 1e-01 may receive at least one PLMN identity in a given cell (In the system information on the broadcast channel, the UE can receive one or more multiple 'PLMN identity' in a given cell). A result of the PLMN selection process performed by the NAS layer is an identifier of the selected PLMN (The result of the PLMN selection performed by NAS is an identifier of the selected PLMN). The NAS layer may provide an equivalent PLMN list to the AS layer through the PLMN selection procedure. The equivalent PLMN list refers to a list of PLMNs selected by the UE 1e-01 for cell selection, cell reselection, and handover and PLMNs considered as equivalents (List of PLMNs considered as equivalent by the UE for cell selection, cell reselection, and handover according to the information provided by NAS). The PLMN selection procedure may be performed before operation 1e-16. For example, when the UE 1e-01 that has transitioned to the RRC connected mode in operation 1e-05 performs a location registration procedure, the UE 1e-01 may maintain a registered PLMN. Alternatively, the UE 1e-01 may maintain the list of selected PLMNs and equivalent PLMNs by selecting the PLMN before transitioning to the RRC connected mode (before operation 1e-05).

When the PLMN is selected, the UE 1e-01 may receive or obtain system information (operation 1e-20) and perform a cell selection process (operation 1e-25). That is, the UE 1e-01 may receive/obtain at least one MIB and SIB1 and perform the cell selection process to camp-on to a suitable cell for the corresponding PLMN. The corresponding PLMN may refer to a PLMN corresponding to Condition 1 above. Specifically, the PLMN corresponding to Condition 1 may be determined through a cell access-related information element (CellAccessRelatedInfo information element) broadcast in SIB1.

The CellAccessRelatedInfo information element may include a PLMN identity list (plmn-IdentityList) information element. The plmn-IdentityList information element may be configured in the following form.

plmn-IdentityList may include a PLMN identity information list (plmn-IdentityInfoList).

plmn-IdentityInfoList may be configured with one or more pieces of PLMN-IdentityInfo.

Each piece of PLMN-IdentityInfo may be configured with plmn-IdentityList including one logical cell identity (cellIdentity) and one or more PLMN-Identities mapped thereto.

The PLMN identity included in the plmn-IdentityList information element may be configured as below.

--- plmn-IdentityList

The plmn-IdentityList is used to configure a set of PLMN-IdentityInfoList elements. Each of thise elements contains a list of one or more PLMN Identities and additional information associated with those PLMNs. The total number of PLMNs in the PLMN-IdentityInfoList does not exceed 12. The PLMN index is defined as b1+2+ ... + b(n-1)+i for the PLMN included at the n-th entry of PLMN-IdentityInfoList and the i-th entry of its corresponding PLMN-IdentityInfo, where b(j) is the number of PLMN-Identity entries in each PLMN-IdentityInfo, respectively.

---

For example, in Table 1 below, PLMN-IdentityInfoList includes PLMN-IdentityInfo 1 and PLMN-IdentityInfo 2. When PLMN-IdentityInfo 1/PLMN-IdentityInfo 2 includes two PLMN-Identities, a PLMN index of a first PLMN-Identity included in PLMN-IdentityInfo 1 may be "1" and a PLMN index of a second PLMN-Identity may be "2". Also, a PLMN index of a first PLMN-Identity included in PLMN-IdentityInfo 2 may be "3" and a PLMN index of a second PLMN-Identity may be "4".

TABLE 1

| PLMN-IdentityInfoList | PLMN-IdentityInfo 1 | 2 PLMN-Identities |
|---|---|---|
| | PLMN-IdentityInfo 2 | 2 PLMN-Identities |

The UE 1e-01 that has camped-on to the suitable cell may perform a cell re-selection process (operation 1e-30). That is, the UE 1e-01 may re-select a cell based on SIB2, SIB3, SIB4, SIB5, SIB6, or the like including a cell re-selection parameter.

In operation 1e-35, the UE 1e-01 may initiate an RRC connection for a certain reason or to transmit and receive data to and from the base station 1e-02. Specifically, in operation 1e-35, when the UE 1e-01 is in the RRC idle mode, the UE 1e-01 may perform an RRC connection establishment procedure with the base station 1e-02. The UE 1e-01 in the RRC idle mode may establish reverse synchronization with the base station 1e-02 and transmit an RRC connection establishment request message (RRCSetupRequest message) to the base station 1e-02 (operation 1e-40). The RRC connection establishment request message may include an identity (ue-Identity) of the UE 1e-01 and an RRC connection establishment cause (establishmentCause). Upon successfully receiving the RRC connection establishment request message, the base station 1e-02 may transmit an RRC connection setup message (RRCSetup message) to the UE 1e-01 (operation 1e-45). The RRC connection setup message may include radio resource configuration information (radioBearerConfig) and master cell group configuration information (masterCellGroup).

Upon successfully receiving the RRC connection setup message, the UE 1e-01 may apply configuration information included in the RRC connection setup message and transition to the RRC connected mode (operation 1e-50). A current cell may be regarded as a primary cell (PCell). The UE 1e-01 that has transitioned to the RRC connected mode may transmit an RRC connection setup complete message (RRCSetupComplete message) to the base station 1e-02 by

---

```
-          CellAccessRelatedInfo
The IE CellAccessRelatedInfo indicates cell access related information for this cell.
                          CellAccessRelatedInfo information element -- ASN1START
-- TAG-CELLACCESSRELATEDINFO-START
CellAccessRelatedInfo   ::=            SEQUENCE {
    plmn-IdentityList                     PLMN-IdentityInfolist,
    cellReservedForOtherUse               ENUMERATED {true} OPTIONAL,      -- Need R
    ...
}
-- TAG-CELLACCESSRELATEDINFO-STOP
-- ASN1STOP
```

---

```
-          PLMN-IdentityInfoList
The IE PLMN-IdentityInfoList includes a list of PLMN identity information.
                         PLMN-IdentityInfoList information element
-- ASN1START
-- TAG-PLMN-IDENTITYINFOLIST-START
PLMN-IdentityInfoList ::=            SEQUENCE (SIZE (1..maxPLMN)) OF PLMN-IdentityInfo
PLMN-IdentityInfo ::=                SEQUENCE {
    plmn-IdentityList                     SEQUENCE (SIZE (1..maxPLMN) ) OF PLMN-Identity,
    trackingAreacode                      TrackingAreaCode                    OPTIONAL,    -- Need R
    ranac                                 RAN-AreaCode                        OPTIONAL,    -- Need R
    cellIdentity                          CellIdentity,
    cellReservedForOperator               Use ENUMERATED {reserved, notReserved},
    ...
}
-- TAG-PLMN-IDENTITYINFOLIST-STOP
-- ASN1STOP
```

13

14 including the following content in the RRC connection setup complete message (operation 1e-55).

One PLMN from among one or more PLMNs included in plmn-Identity List broadcast in SIB1 may be set to a PLMN (selectedPLMN-Identity) selected by a higher layer (set the selectedPLMN-Identity to the PLMN selected by upper layers from the PLMN(s) included in the plmn-IdentityList in SIB1). For example, as described above, selectedPLMN-Identity may refer to the first PLMN-Identity in plmn-IdentityList mapped to cellIdentity in the first PLMN-IdentityInfo in PLMN-IdentityInfoList.

In operation 1e-35, when the UE 1e-01 is in the RRC inactive mode, the UE 1e-01 may perform an RRC connection resume procedure with the base station 1e-02. The UE 1e-01 in the RRC inactive mode may establish reverse synchronization with the base station 1e-02 and transmit an RRC connection resume request message (RRCResumeRequest or RRCResumeRequest1 message) to the base station 1e-02 (operation 1e-40). The RRC connection resume request message may include an identity (resumeIdentity) of the UE 1e-01, a resume message authentication code for integrity (hereinafter, referred to as resumeMAC-I), a resume cause (resumeCause), and the like. Upon successfully receiving the RRC connection resume request message, the base station 1e-02 may transmit an RRC connection resume message (RRCResume message) to the UE 1e-01 (operation 1e-45). The RRC connection resume message may include at least one of radio resource configuration information (radioBearerConfig), master cell group configuration information (masterCellGroup), measurement configuration information (measConfig), an indicator (fullConfig) indicating full configuration, second radio resource configuration information (radioBearerConfig2), or an sk-Counter value.

Upon successfully receiving the RRC connection resume message, the UE 1e-01 may apply configuration information included in the RRC connection resume message and transition to the RRC connected mode (operation 1e-50). The UE 1e-01 may regard a current cell as a PCell. The UE 1e-01 that has transitioned to the RRC connected mode may transmit an RRC connection resume complete message (RRCResumeComplete message) to the base station 1e-02 (operation 1e-55). When the higher layer has provided the PLMN, selectedPLMN-Identity may be set to the PLMN selected by the higher layer from among one or more PLMNs included in plmn-Identity List broadcasted in SIB1 (set the selectedPLMN-Identity to the PLMN selected by upper layers from the PLMN(s) included in the plmn-IdentityList in SIB1). As described above, the UE 1e-01 according to the present embodiment does not include a value of the selected PLMN-Identity itself in the RRC connection resume complete message, and may include an index value of the selected PLMN in the RRC connection resume complete message.

Figure 1F:
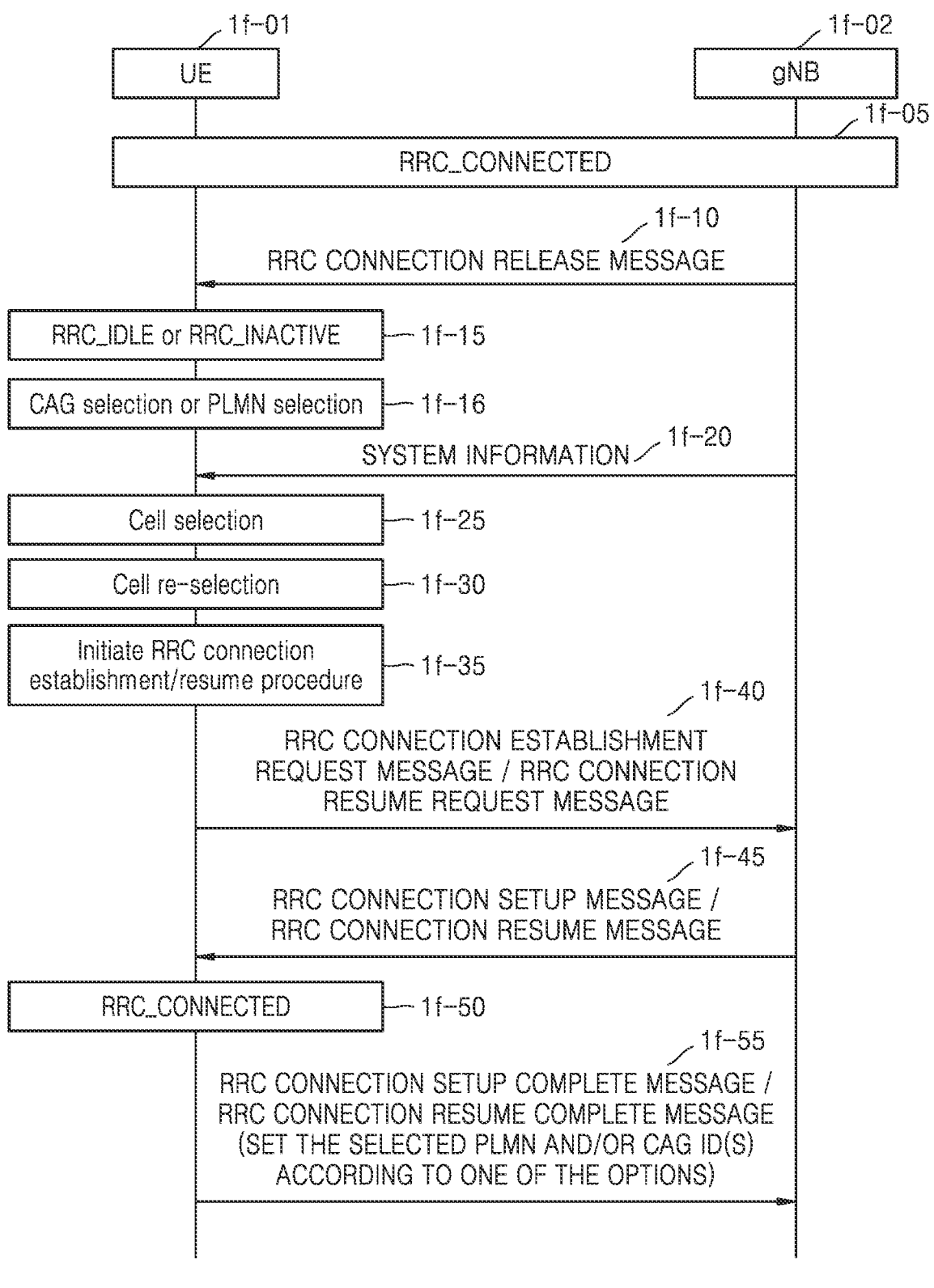
FIG. 1F is a diagram for describing a procedure, performed by a UE in an RRC inactive mode (RRC_INACTIVE) or an RRC idle mode (RRC_IDLE), of establishing an RRC connection by accessing a closed access group (CAG) cell in a public network integrated non-public network (PNI-NPN), in a next-generation mobile communication system, according to an embodiment of the disclosure.

FIG. 1F is a diagram for describing a procedure, performed by a UE in an RRC inactive mode (RRC_INACTIVE) or an RRC idle mode (RRC_IDLE), of establishing an RRC connection by accessing a closed access group (CAG) cell in a public network integrated non-public network (PNI-NPN), in a next-generation mobile communication system, according to an embodiment of the disclosure.

The PNI-NPN according to an embodiment of the disclosure may denote an NPN deployed through a PLMN (PNI-NPNs are NPNs made available via PLMNs). Therefore, in the case of the NPN formed through the PLMN, the UE has a subscription for the corresponding PLMN (when an NPN is made available via a PLMN, then the UE has a subscription for the PLMN). In detail, a CAG may identify a group of subscribers permitted to access one or more CAG cells associated with the CAG. (A CAG identifies a group of subscribers who are permitted to access one or more CAG cells associated to the CAG). In other words, the CAG may prevent the UE that does not have access rights to CAG cells from accessing the PNI-NPN (CAG is used for PNI-NPNs to prevent UE(s), which are not allowed to access the NPN via the associated cell(s), from automatically selecting and accessing the associated cell(s)). The UE that is not in a stand-alone non-public network (SNPN) may be considered as a suitable cell when the following conditions are satisfied.

Condition 1-1: A cell is a part of a selected PLMN, a registered PLMN, or a PLMN of an equivalent PLMN list, and a CAG-ID broadcast by the cell for the corresponding PLMN is included in a UE's allowed CAG list (e.g., a list of CAG identifiers that the UE is allowed to access (The cell is part of either the selected PLMN or the registered PLMN or PLMN of the Equivalent PLMN list, and for that PLMN allowed CAG list in the UE for that PLMN includes a CAG-ID broadcast by the cell for that PLMN).

Condition 1-2: A cell is a part of a selected PLMN, a registered PLMN, or a PLMN of an equivalent PLMN list, CAG-only indication is not broadcast or is false, and CAG-ID(s) is not broadcasted (The cell is part of either the selected PLMN or the registered PLMN or PLMN of the Equivalent PLMN list of the UE for which the PLMN-ID is broadcast by the cell with no associated CAG-IDs and for which CAG-only indication is absent or false).

Condition 2: A cell satisfies cell selection criteria.

→The cell selection criteria may denote Equation 1 below.

$$Srxlev>0 \text{ AND } Squal>0 \qquad \text{Equation 1}$$

where:

$$Srxlev=Qrxlevmeas-(Qrxlevmin+Qrxlevminoffset)-Pcompensation-Qoffsettemp$$

$$Squal=Qqualmeas-(Qqualmin+Qqualminoffset)-Qoffsettemp$$

For the definitions of parameters used in Equation 1, refer to 3GPP standard specification "38.304: User Equipment (UE) procedures in idle mode." The parameters may be included in system information (e.g., SIB1 or SIB2) broadcast by the cell. Hereinafter, contents of the 3GPP standard specification may be equally applied to embodiments of the disclosure to which Equation 1 is applied.

Condition 3: A cell is not barred according to information that is most recently provided from an NAS layer, and the cell is a part of at least one tracking area (TA) that is not a part of a list of "forbidden tracking areas" which belongs to a PLMN that fulfils Condition 1-1 and/or Condition 1-2 (The cell is part of at least one TA that is not part of the list of "Forbidden Tracking Areas" which belongs to a PLMN that fulfils the first bullet above).

→The cell is barred when, for example, a "cellBarred" indicator is set to "barred" in at least MIB, an Rel-16 "cellReservedForOperatorUse" indicator is set to "reserved" in SIB1, an Rel-16 "cellReservedForFutureUse" indicator is set to "reserved", or a Rel-15 "cellReservedForOtherUse" indicator is set to "true" and CAG-ID(s) is not broadcasted in the cell.

Referring to FIG. 1F, a UE 1*f*-01 may establish an RRC connection with a base station (e.g., gNB) 1*f*-02 and thus be in an RRC connected mode (RRC_CONNECTED) (operation 1*f*-05).

When there is no data transmission or reception for a certain reason or for a certain time, the base station 1*f*-02 may transmit an RRC connection release message (RRCRelease) to the UE 1*f*-01 (operation 1*f*-10). When suspend configuration information (suspendConfig) is included in the RRC connection release message, the UE 1*f*-01 may transition to an RRC inactive mode, and when the suspend configuration information is not included, the UE 1*f*-01 may transition to an RRC idle mode (operation 1*f*-15).

The UE 1*f*-01 that has transitioned to the RRC idle mode or the RRC inactive mode as an SNPN access mode may select a CAG or a PLMN (1*f*-16). A method of selecting a tion. The total number of PLMNs included in the plmn-IdentityList and npn-IdentityInfoList information elements may be limited not to exceed 12. In the present embodiment, the number of PLMNs may be limited by one of the following methods.

The total number of PLMNs (identified by a PLMN identity), PNI-NPNs (identified by a PLMN identity and a CAG-ID), and SNPNs (identified by a PLMN identity and a NID) together in the PLMN-IdentityInfoList and NPN-IdentityInfoList does not exceed 12

The total number of PLMNs (identified by PLMN identity(s) itself in the plmn-IdentityInfoList and NPN-IdentityInfoList) does not exceed 12

An ASN.1 structure for the CellAccessRelatedInfo information element may be represented as follows.

```
-                       CellAccessRelatedInfo
The IE CellAccessRelatedInfo indicates cell access related information for this cell.
                                                        CellAccessRelatedInfo information element
-- ASN1START
-- TAG-CELLACCESSRELATEDINFO-START
CellAccessRelatedInfo   ::=                    SEQUENCE {
    plmn-IdentityList                            PLMN-IdentityInfoList,
    cellReservedForOtherUse                        ENUMERATED {true}  OPTIONAL,   -- Need R
    ...,
    [[
    cellReservedForFutureUse-r16   ENUMERATED {true}      OPTIONAL,   -- Need R
    npn-IdentityInfoList-r16        NPN-IdentityInfoList-r16  OPTIONAL      -- Need R
    ]]
}
-- TAG-CELLACCESSRELATEDINFO-STOP
-- ASN1STOP
```

PLMN has been described in the above embodiments. When the UE 1*f*-01 selects the CAG, for example, an AS layer of the UE 1*f*-01 may scan all RF channels in an NR band according to capability thereof on a request from a NAS layer of the UE 1*f*-01, and search for one or more available CAGs (In the UE on request of NAS, the AS shall scan all RF channels in the NR bands according to its capabilities to find available CAGs). On each carrier, the UE 1*f*-01 may search for at least a cell with the strongest signal and report, to the NAS layer, one or more PLMNs and one or more CAG IDs therefor by reading system information from the cell, and when a human-readable network name (HRNN) is broadcasted in the system information, the AS layer of the UE 1*f*-01 may also report the received HRNN to the NAS layer (On each carrier, the UE shall at least search for the strongest cell, read its system information and report available CAG ID(s) together with their HRNN (if broadcast) and PLMN(s) to the NAS). A higher layer may select a CAG and notify the CAG to the AS layer (If NAS has selected a CAG and provided this selection to AS).

The UE 1*f*-01 may receive/obtain the system information (operation 1*f*-20) and perform a cell selection process (operation 1*f*-25). That is, the UE 1*f*-01 may receive/obtain at least one MIB and SIB1 and perform the cell selection process to camp-on to a suitable cell belonging to the selected CAG. Specifically, Condition 1 may be determined through a CellAccessRelatedInfo information element broadcast in SIB1.

The CellAccessRelatedInfo information element may include at least one of a plmn-IdentityList information element or a npn-IdentityInfoList information element. The plmn-IdentityList information element may follow the above-described embodiments. npn-IdentityInfoList may include a list of NPN identification informa- According to an RAN sharing structure in an NPN according to the present embodiment, the npn-IdentityInfoList information element may include only a CAG identifier list (cag-IdentityList), only nid-List (NPN identity defining SNPN), or cag-IdentityList and nid_List. When an NG-RAN is shared by one or more PNI-NPNs, or by one or more PNI-NPNs and one or more PLMNs included in the plmn-IdentityList information, only cag-IdentityList may be included in npn-IdentityInfoList. Similarly, when the NG-RAN is shared by one or more SNPNs, or by one or more SNPNs and one or more PLMNs included in the plmn-IdentityList information, only nid-List may be included in npn-IdentityInfoList. When the NG-RAN is shared by one or more PNI-NPNs and one or more SNPNs, cag-IdentityList and nid-List may be included in npn-IdentityInfoList. In this case, one or more PLMNs may not be included in the plmn-IdentityList information for regular access described above. When the NG-RAN is shared by one or more PNI-NPNs, or by one or more PNI-NPNs and one or more PLMNs or one or more SNPNs, cag-IdentityList and nid-List may be included in plmn-IdentityList and npn-IdentityInfoList.

The cag-IdentityList may include one or more CAG identifiers (CAG-Identity).

An information element for each CAG-Identity may include plmn-IdentityList (which may be indicated by npn-IdentityList) including one or more PLMN identities (or NPN identities) and cag-identityList mapped to each PLMN identity (or NPN identity), to include the identities of one or more PNI-NPNs. That is, the CAG-Identity information element may include at least one of the following parameters.

CellIdentity value plmn-IdentityList (npn-IdentityList) including one or more PLMN identities Each PLMN identity may be a plmn-Identity value or a plmn-index value. For example, when the plmn-Identity value included in plmn-IdentityList (an information element different from npn-IdentityInfoList) of SIB1 is used identically, the plmn-index value may be included, and otherwise, the plmn-Identity value itself may be included. The plmn-index value is an integer value and may be determined by the following description.

---

The PLMN index is defined as b1+b2+ ... +b(n-1)+i for the PLMN included at the n-th entry of PLMN-IdentityInfoList and the i-th entry of its corresponding PLMN-IdentityInfo, where b(j) is the number of PLMN-Identity entries in each PLMN-IdentityInfo, respectively.

--- cag-IdentityList indicating a list of CAG identifiers mapped to each plmn-Identity value or plmn-index value Tracking area code ranac indicating a RAN area code Indicator (cellReservedForOperatorUse) indicating whether cell is reserved for operator use. This indicator may be applied to all PLMNs included in CAG-Identity.

Indicator (cellReservedForFutureUse) indicating whether cell is reserved for future use. This indicator may be applied to all PLMNs included in CAG-IdentityInfo.

The UE 1f-01 that has camped-on a suitable cell may perform a cell re-selection process (operation 1f-30). That is, the UE 1f-01 may re-select a cell based on SIB2, SIB3, SIB4, SIB5, SIB6, or the like including a cell re-selection parameter.

In operation 1f-35, the UE 1f-01 may initiate an RRC connection for a certain reason or to transmit and receive data to and from the base station 1f-02. Specifically, in operation 1f-35, when the UE 1f-01 is in the RRC idle mode, the UE 1f-01 may perform an RRC connection establishment procedure with the base station 1f-02. The UE 1f-01 in the RRC idle mode may establish reverse synchronization with the base station 1f-02 and transmit an RRC connection establishment request message (RRCSetupRequest message) to the base station 1f-02 (operation 1f-40). The RRC connection establishment request message may include an identity (ue-Identity) of the UE 1f-01 and an RRC connection establishment cause (establishmentCause). Upon successfully receiving the RRC connection establishment request message, the base station 1f-02 may transmit an RRC connection setup message (RRCSetup message) to the UE 1f-01 (operation 1f-45). The RRC connection setup message may include radio resource configuration information (radioBearerConfig) and master cell group configuration information (masterCellGroup).

Upon successfully receiving the RRC connection setup message, the UE 1f-01 may apply configuration information included in the RRC connection setup message and transition to the RRC connected mode (operation 1f-50). A current cell may be regarded as a PCell. The UE 1f-01 that has transitioned to the RRC connected mode may transmit an RRC connection setup complete message (RRCSetupComplete message) to the base station 1f-02 by including the following content in the RRC connection setup complete message (operation 1f-55).

In the present embodiment, selectedPLMN-Identity may be set to a PLMN selected by a higher layer from among one or more PLMNs included in plmn-IdentityList or npn-IdentityInfoList broadcast in SIB1 (set the selectedPLMN-Identity to the PLMN selected by upper layers from the PLMN(s) included in the plmn-IdentityList or npn-IdentityInfoList in SIB1), and the selectedPLMN-Identity may be included in the RRC connection setup complete message. Here, a method of setting selectedPLMN-Identity may vary depending on whether a CAG cell is selected (a condition that satisfies a suitable cell, e.g., Condition 1-1, Condition 2, or Condition 3), or whether a cell for regular access is selected (a condition that satisfies a suitable cell, e.g., Condition 1-2, Condition 2, or Condition 3), in operation 1f-16, 1f-25, or 1f-30.

Case 1: When a CAG cell is selected, a selected PLMN and a CAG ID may be included in the RRC connection setup complete message.

A PLMN index selected considering plmn-IdentityList and npn-IdentityInfoList fields included in SIB1 together is included (Index of the PLMN selected by the UE from the plmn-IdentityList and npn-IdentityInfoList fields included in SIB1).

Because a PNI-NPN may be identified by a combination of a PLMN identity (or NPN identity) and the CAG ID, the CAG ID included in the UE's allowed CAG list for the selected PLMN may be included in an NAS message (due to a security issue). For example, the NAS message may refer to dedicatedNAS-Message, which is a message included in the RRC connection setup complete message.

TABLE 2

| | | |
|---|---|---|
| PLMN-IdentityInfoList | PLMN-IdentityInfo 1 | 2 PLMN-Identities |
| | PLMN-IdentityInfo 2 | 2 PLMN-Identities |
| NPN-IdentityInfoList | NPN-IdentityInfo 1 | 2 cag-Identites |
| | NPN-IdentityInfo 2 | 2 cag-Identites |
| NPN-IdentityInfoList | NPN-IdentityInfo 3 | 2 NID |
| | NPN-IdentityInfo 4 | 2 NID |

Case 2: When a cell for regular access is selected.

A PLMN index selected considering only a plmn-IdentityList field included in SIB1 is included (Index of the PLMN selected by the UE from the plmn-IdentityList included in SIB1)

In operation 1f-35, when the UE 1f-01 is in the RRC inactive mode, the UE 1f-01 may perform an RRC connection resume procedure with the base station 1f-02. The UE 1f-01 in the RRC inactive mode may establish reverse synchronization with the base station 1f-02 and transmit an RRC connection resume request message (RRCResumeRequest or RRCResumeRequest1 message) to the base station 1f-02 (operation 1f-40). The RRC connection resume request message may include an identity (resumeIdentity) of the UE 1f-01, a resume message authentication code for integrity (hereinafter, referred to as resumeMAC-I), a resume cause (resumeCause), and the like. Upon successfully receiving the RRC connection resume request message, the base station 1f-02 may transmit an RRC connection resume message (RRCResume message) to the UE 1f-01 (operation 1f-45). The RRC connection resume message may include at least one of radio resource configuration information (radioBearerConfig), master cell group configuration information (masterCellGroup), measurement configuration information (measConfig), an indicator (fullConfig) indicating full configuration, second radio resource configuration information (radioBearerConfig2), or an sk- Counter value. Upon successfully receiving the RRC connection resume message, the UE 1*f*-01 may apply configuration information included in the RRC connection resume message and transition to the RRC connected mode (operation 1*f*-50). A current cell may be regarded as a PCell. The UE 1*f*-01 that has transitioned to the RRC connected mode may transmit an RRC connection resume complete message (RRCResumeComplete message) to the base station 1*f*-02 (operation 1*f*-55). The RRC connection resume complete message may include PLMN information and/or CAG ID selected according to the above-described option.

Figure 1G:
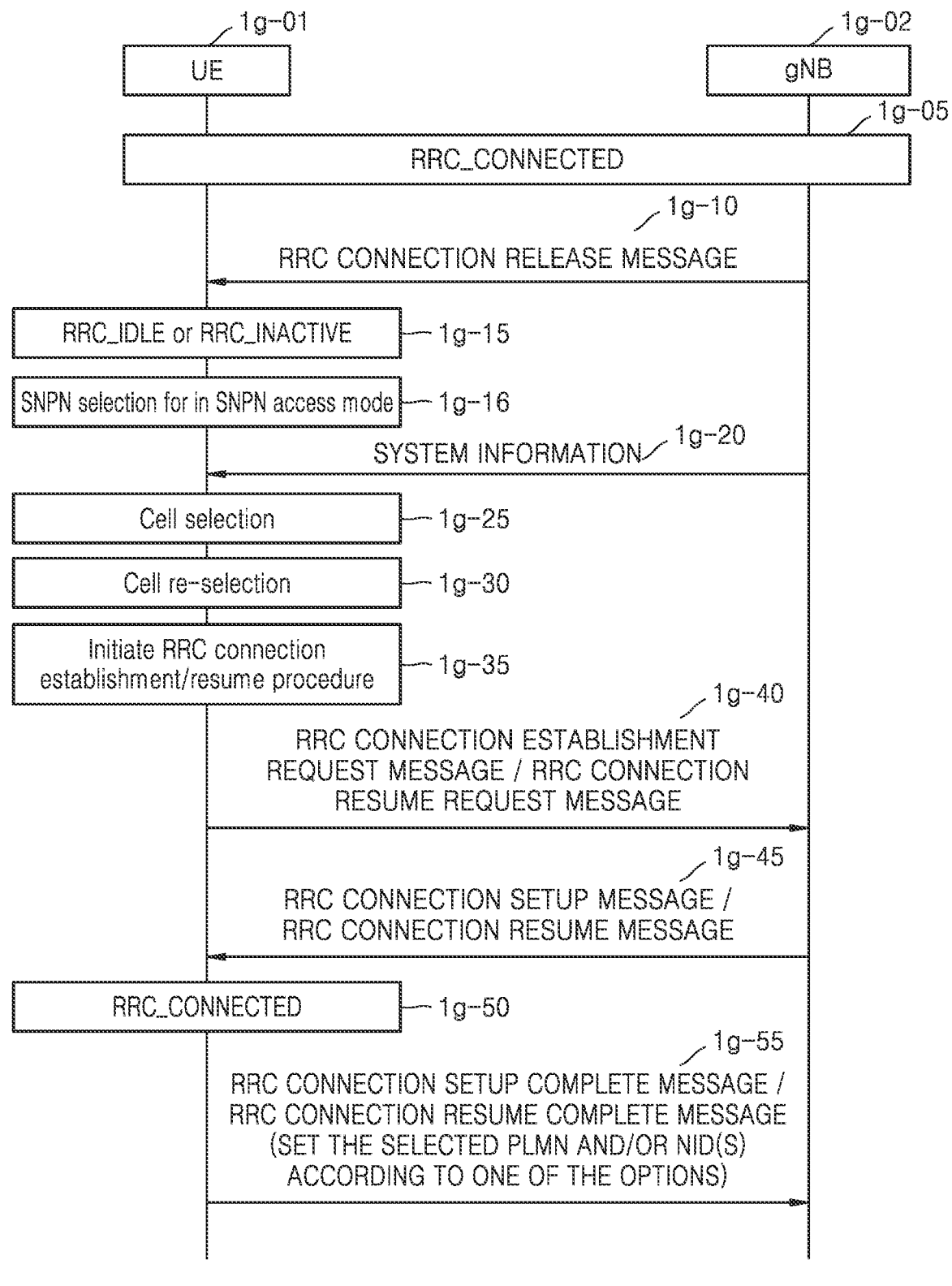
FIG. 1G is a diagram for describing a procedure, performed by a UE in an RRC inactive mode (RRC_INACTIVE) or an RRC idle mode (RRC_IDLE), of establishing an RRC connection by accessing a stand-alone non-public network (SNPN) cell in an SNPN, in a next-generation mobile communication system, according to an embodiment of the disclosure.

FIG. 1G is a diagram for describing a procedure, performed by a UE in an RRC inactive mode (RRC_INACTIVE) or an RRC idle mode (RRC_IDLE), of establishing an RRC connection by accessing a stand-alone non-public network (SNPN) cell in an SNPN, in a next-generation mobile communication system, according to an embodiment of the disclosure.

An SNPN according to an embodiment of the disclosure may denote a network operated by an NPN operator without depending on a network function provided by a PLMN (SNPN is operated by an NPN operator and not relying on network functions provided by a PLMN). Therefore, when a UE is in an SNPN access mode, the UE may not perform a normal PLMN selection procedure (When the UE is set to operate in SNPN access mode the UE does not perform normal PLMN selection procedures). The UE operating in the SNPN access mode may receive one or more available PLMN IDs and a list of available network identifiers (NIDs) from broadcasted system information, and apply the same to a network selection process (UEs operating in SNPN access mode read the available PLMN IDs and list of available NIDs from the broadcast system information and take them into account during network selection). That is, the UE operating in the SNPN may be configured with subscriber identifiers and credential information for one or more SNPNs identified by a combination of PLMN ID and NID, and thus, may support the SNPN access mode (An SNPN-enabled UE is configured with subscriber identifiers and credentials for one or multiple SNPNs identified by the combination of PLMN ID and NID, so can support the SNPN access mode). The UE that is set in the SNPN access mode (a UE that is set to operate in SNPN access mode) may regard a cell as a suitable cell when the following conditions are satisfied.

Condition 1: When a cell belongs to an SNPN selected or registered by a UE (the cell is part of either the selected SNPN or the registered SNPN of the UE).

Condition 2: When a cell satisfies cell selection criteria. The cell selection criteria may denote Equation 1 below.

$$Srxlev>0 \ AND \ Squal>0 \qquad \text{Equation 1}$$

where:

$$Srxlev=Qrxlevmeas-(Qrxlevmin+Qrxlevminoffset)-\\Pcompensation \ Qoffsettemp$$

$$Squal=Qqualmeas-(Qqualmin+Qqualminoffset)-\\Qoffsettemp$$

For the definitions of parameters used in Equation 1, refer to 3GPP standard specification "38.304: User Equipment (UE) procedures in idle mode." The parameters may be included in system information (e.g., SIB1 or SIB2) broadcast by the cell. Hereinafter, contents of the 3GPP standard specification may be equally applied to embodiments of the disclosure to which Equation 1 is applied.

Condition 3: A case in which the cell is not barred according to information that is most recently provided from the NAS layer, and the cell is part of at least one tracking area (TA) that is not part of the list of "forbidden tracking areas" which belongs to an SNPN that satisfies Condition 1 (The cell is part of at least one TA that is not part of the list of "forbidden Tracking Areas" which belongs to either the selected SNPN or the registered SNPN of the UE).

The cell is barred when, for example, a "cellBarred" indicator is set to "barred" in at least MIB, an Rel-16 "cellReservedForOperatorUse" indicator is set to "reserved" in SIB1, or a Rel-16 "cellReservedForFutureUse" is set to "reserved".

Referring to FIG. 1G, a UE 1*g*-01 may establish an RRC connection with a base station 1*g*-02 (e.g., gNB) and thus be in an RRC connected mode (RRC_CONNECTED), in operation 1*g*-05.

When there is no data transmission or reception for a certain reason or for a certain time, the base station 1*g*-02 may transmit an RRC connection release message (RRCRelease) to the UE 1*g*-01 (operation 1*g*-10). When suspend configuration information (suspendConfig) is included in the RRC connection release message, the UE 1*g*-01 may transition to an RRC inactive mode, and when the suspend configuration information is not included, the UE 1*g*-01 may transition to an RRC idle mode (operation 1*g*-15).

The UE 1*g*-01 that has transitioned to the RRC idle mode or the RRC inactive mode set to an SNPN access mode may select an SNPN (1*g*-16). For example, an AS layer of the UE 1*g*-01 may scan all RF channels in an NR band according to capability thereof on a request from a NAS layer of the UE 1*g*-01, and search for one or more available SNPNs (In the UE on request of NAS, the AS shall scan all RF channels in the NR bands according to its capabilities to find available SNPNs). On each carrier, the UE 1*g*-01 may search for at least a cell with the strongest signal and report, to the NAS layer, one or more SNPN identifiers by reading system information from the cell, and when an HRNN is broadcasted in the system information, the AS layer of the UE 1*g*-01 may also report the received HRNN to the NAS layer (On each carrier, the UE shall at least search for the strongest cell, read its system information and report SNPN identifiers together with their HRNN (if broadcast) to the NAS). A higher layer may select an SNPN and notify the SNPN to the AS layer (If NAS has selected a SNPN and provided this selection to AS).

The UE 1*g*-01 may receive or obtain the system information (operation 1*g*-20) and perform a cell selection process (operation 1*g*-25). That is, the UE 1*g*-01 may receive/obtain at least one MIB and SIB1 and perform the cell selection process to camp-on to a suitable cell belonging to the selected SNPN. Specifically, Condition 1 may be determined through a CellAccessRelatedInfo information element broadcast in SIB1.

The CellAccessRelatedInfo information element may include at least one of a plmn-IdentityList information element or a npn-IdentityInfoList information element. The plmn-IdentityList information element may follow the above-described embodiments. npn-IdentityInfoList may include a list of NPN identification information. The total number of PLMNs included in the plmn-IdentityList and npn-IdentityInfoList information elements may be limited not to exceed 12. In the present embodiment, the number of PLMNs may be limited by one of the following methods.

The total number of PLMNs (identified by a PLMN identity), PNI-NPNs (identified by a PLMN identity and a CAG-ID), and SNPNs (identified by a PLMN identity and a NID) together in the PLMN-IdentityInfoList and NPN-IdentityInfoList does not exceed 12

The total number of PLMNs (identified by PLMN identity(s) itself in the plmn-Identity InfoList and NPN-IdentityInfoList) does not exceed 12

An ASN.1 structure for the CellAccessRelatedInfo information element may be represented as follows.

used for SNPN may be the same as the plmn-Identity value included in plmn-IdentityList because a PLMN used for regular access may be used identically. The plmn-index value is an integer value and may be determined according to the following description.

---

The PLMN index is defined as b1+b2+ ... +b(n-1)+i for the PLMN included at the n-th entry of PLMN-IdentityInfoList and the i-

---

```
-          CellAccessRelatedInfo
The IE CellAccessRelatedInfo indicates cell access related information for this cell.
                                        CellAccessRelatedInfo information element
-- ASN1START
-- TAG-CELLACCESSRELATEDINFO-START
CellAccessRelatedInfo   ::=             SEQUENCE {
    plmn-IdentityList                   PLMN-IdentityInfoList,
    cellReservedForOtherUse             ENUMERATED {true}   OPTIONAL,   -- Need R
    ...,
    [[
    cellReservedForFutureUse-r16        ENUMERATED (true)        OPTIONAL,   -- Need R
    npn-IdentityInfoList-r16            NPN-IdentityInfoList-r16 OPTIONAL       -- Need R
    ]]
}
-- TAG-CELLACCESSRELATEDINFO-STOP
-- ASN1STOP
```

According to an RAN sharing structure in the NPN according to the present embodiment, the npn-IdentityInfoList information element may include only cag-Identity related information, only snpn-Identity related information, or cag-Identity related information and snpn-Identity related information. When an NG-RAN is shared by one or more PNI-NPNs, or by one or more PNI-NPNs and one or more PLMNs included in the plmn-IdentityList information, only the cag-Identity related information may be included in npn-IdentityInfoList. Similarly, when the NG-RAN is shared by one or more SNPNs, or by one or more SNPNs and one or more PLMNs included in the plmn-IdentityList information, only the snpn-Identity related information may be included in the npn-IdentityInfoList. When the NG-RAN is shared by one or more PNI-NPNs and one or more SNPNs, the cag-Identity related information and the snpn-Identity related information may be included in the npn-IdentityInfoList. In this case, one or more PLMNs may not be included in the plmn-IdentityList information for regular access. When the NG-RAN is shared by one or more PNI-NPNs, one or more PNI-NPNs and one or more PLMNs, or one or more SNPNs, the cag-Identity related information and the snpn-Identity related information may be included in plmn-IdentityList and npn-IdentityInfoList.

The snpn-Identity related information may include one or more SNPN-Identity information elements.

Each snpn-Identity related information element may include a plurality of PLMN identities and a list of NIDs mapped to the corresponding PLMN identities to include a plurality of SNPN identities. That is, the snpn-Identity related information element may include at least one of the following parameters.

CellIdentity value plmn-Identity value or plmn-index value. For example, when the plmn-Identity value included in the plmn-IdentityList of SIB1 is used identically, the plmn-index value may be included, and otherwise, the plmn-Identity value itself may be included. The plmn-identity -continued ---
th entry of its corresponding PLMN-IdentityInfo, where b(j) is the number of PLMN-Identity entries in each PLMN-IdentityInfo, respectively

--- plmn-Identity value or NID mapped to plmn-index value

Tracking area code ranac indicating RAN area code

Indicator (cellReservedForOperatorUse) indicating whether cell is reserved for operator use. This indicator may be applied per plmn.

Indicator (cellReservedForFutureUse) indicating whether cell is reserved for future use. This indicator may be applied to the PLMN.

The UE 1g-01 that has camped-on a suitable cell may perform a cell re-selection process (operation 1g-30). That is, the UE 1g-01 may re-select a cell based on SIB2, SIB3, SIB4, SIB5, SIB6, or the like including a cell re-selection parameter.

In operation 1g-35, the UE 1g-01 may initiate an RRC connection for a certain reason or to transmit and receive data to and from the base station 1g-02. Specifically, in operation 1g-35, when the UE 1g-01 is in the RRC idle mode, the UE 1g-01 may perform an RRC connection establishment procedure with the base station 1g-02. The UE 1g-01 in the RRC idle mode may establish reverse synchronization with the base station 1g-02 and transmit an RRC connection establishment request message (RRCSetupRequest message) to the base station 1g-02 (operation 1g-40). The RRC connection establishment request message may include an identity (ue-Identity) of the UE 1g-01 and an RRC connection establishment cause (establishmentCause). Upon successfully receiving the RRC connection establishment request message, the base station 1g-02 may transmit an RRC connection setup message (RRCSetup message) to the UE 1g-01 (operation 1g-45). The RRC connection setup message may include radio resource configuration information (radioBearerConfig) and master cell group configuration information (masterCellGroup).

Upon successfully receiving the RRC connection setup message, the UE 1g-01 may apply configuration information included in the RRC connection setup message and transition to the RRC connected mode (operation 1g-50). A current cell may be regarded as a PCell. The UE 1g-01 that has transitioned to the RRC connected mode may transmit an RRC connection setup complete message (RRCSetupComplete message) to the base station 1g-02 by including the following content in the RRC connection setup complete message (operation 1g-55).

In the present embodiment, selectedPLMN-Identity may be set to a PLMN selected by a higher layer from among one or more PLMNs included in plmn-IdentityList or npn-IdentityInfoList broadcast in SIB1 (set the selectedPLMN-Identity to the PLMN selected by upper layers from the PLMN(s) included in the plmn-IdentityList or npn-IdentityInfoList in SIB1), and the selectedPLMN-Identity may be included in the RRC connection setup complete message. Here, when a suitable SNPN cell is selected in operation 1g-16, 1g-25, or 1g-30, it is proposed to include the selected SNPN information in the RRC connection setup complete message. Here, the selectedPLMN-Identity may be included in the RRC connection setup complete message as below.

A PLMN index selected considering plmn-IdentityList and npn-IdentityInfoList fields included in SIB1 together is included (Index of the PLMN selected by the UE from the plmn-IdentityList and npn-IdentityInfoList fields included in SIB1).

The SNPN may be identified by a combination of the PLMN identity and the NID. Therefore, because the PLMN and the NID are mapped one-to-one, the UE 1g-01 may not include the NID in the RRC connection release message. Alternatively, the UE 1g-01 may include, in the RRC connection setup complete message, the selected PLMN and the NID (supportable by the UE 1g-01) or an NID list mapped thereto. When the NIDs are mapped to the PLMN in a list, the UE 1g-01 may additionally include, in the RRC connection setup complete message, the selected PLMN and the selected NID or NID list mapped thereto. Alternatively, the UE 1g-01 may include, in an NAS message contained in the RRC connection setup complete message, the selected PLMN and the selected NID or NID list mapped thereto. As such, the NID or NID list may be included in the NAS message contained in the RRC connection setup complete message, or may be included in the RRC connection setup complete message itself.

TABLE 3

| PLMN-IdentityInfoList | PLMN-IdentityInfo 1 | 2 PLMN-Identities |
| | PLMN-IdentityInfo 2 | 2 PLMN-Identities |
| NPN-IdentityInfoList | NPN-IdentityInfo 1 | 2 cag-Identites |
| | NPN-IdentityInfo 2 | 2 cag-Identites |

TABLE 3-continued

| NPN-IdentityInfoList | NPN-IdentityInfo 3 | 2 NID |
| | NPN-IdentityInfo 4 | 2 NID |

In operation 1g-35, when the UE 1g-01 is in the RRC inactive mode, the UE 1g-01 may perform an RRC connection resume procedure with the base station 1g-02. The UE 1g-01 in the RRC inactive mode may establish reverse synchronization with the base station 1g-02 and transmit an RRC connection resume request message (RRCResumeRequest or RRCResumeRequest1 message) to the base station 1g-02 (operation 1g-40). The RRC connection resume request message may include an identity (resumeIdentity) of the UE 1g-01, a resume message authentication code for integrity (hereinafter, referred to as resumeMAC-I), a resume cause (resumeCause), and the like. Upon successfully receiving the RRC connection resume request message, the base station 1g-02 may transmit an RRC connection resume message (RRCResume message) to the UE 1g-01 (operation 1g-45). The RRC connection resume message may include at least one of radio configuration information (radioBearerConfig), master cell group configuration information (masterCellGroup), measurement configuration information (measConfig), an indicator (fullConfig) indicating full configuration, second radio resource configuration information (radioBearerConfig2), or an sk-Counter value. Upon successfully receiving the RRC connection resume message, the UE 1g-01 may apply configuration information included in the RRC connection resume message and transition to the RRC connected mode (operation 1g-50). A current cell may be regarded as a PCell. The UE 1g-01 that has transitioned to the RRC connected mode may transmit an RRC connection resume complete message (RRCResumeComplete message) to the base station 1g-02 (operation 1g-55). The RRC connection resume complete message may include PLMN information and/or NID selected according to the above-described option.

In the disclosure, processes of a regular access, an access to PNI-NPN, and an access to an SNPN of a UE have been described with reference to FIGS. 1E, IF, and 1G, and the processes may be summarized as below.

1. Type of Cell

| Type of Cell | Description |
|---|---|
| NPN-only Cell | A cell provide access to only NPN UE |
| Shared Cell | A cell provide access to both normal UE and NPN UE |
| Public Network-only Cell (PN-only Cell) | A cell provide access to only normal UE |

As a setting for the NPN-only cell, SIB1 provides CellAccessRelatedInfo as follows and is set as follows.
    cellReservedForOtherUse is set to true
    Related information is set in npn-IdentityInfoList

```
CellAccessRelatedInfo ::=        SEQUENCE {
    plmn-IdentityList                PLMN-IdentityInfoList,
    cellReservedForOtherUse          ENUMERATED {true} OPTIONAL,    -- Need R
    ...,
    [[
    cellReservedForFutureUse-r16 ENUMERATED {true}           OPTIONAL,    -- Need R
    npn-IdentityInfoList-r16         NPN-IdentityInfoList-r16    OPTIONAL    -- Need R
    ]]
}
```

CellAccessRelatedinfo field descriptions

| cellReservedForFutureUse |
| --- |
| Indicates whether the cell is reserved, as defined in 38.304 [20] for future use. The field is applicable to all PLMNs and NPNs. |
| cellReservedForOtherUse |
| Indicates whether the cell is reserved, as defined in 38.304 [20]. The field is applicable to all PLMNs. |
| npn-IdentityinfoList |
| The non-IdentityInfoList is used to configure a set of NPN-IdentityInfo elements. Each of those elements contains a list of one or more NPN Identities and additional information associated with those NPNs. The total number of PLMNs (identified by a PLMN identity in plmn-IdentityList), PNI-NPNs (identified by a PLMN identity and a CAG-ID), and SNPNs (identified by a PLMN identity and a NID) together in the PLMN-IdentityInfoList and NPN-IdentityInfoList does not exceed 12, except for the NPN-only cells. In case of NPN-only cells the PLMN-IdentityList contains a single element that does not count to the limit of 12. The NPN index is defined as B + FFS, where B is the index used for the last PLMN in the PLMNIdentittyInfoList. In NPN-only cells B is considered 0. |
| plmn-IdentityList |
| The plmn-IdentityList is used to configure a set of PLMN-IdentityInfoList elements. Each of those elements contains a list of one or more PLMN Identities and additional information associated with those PLMNs. A PLMN-identity can be included only once, and in only one entry of the PLMN-IdentityInfoList. The PLMN index is defined as $b1 + b2 + \ldots + b(n-1) + 1$ for the PLMN included at the n-th entry of PLMN-IdentityInfoList and the i-th entry of its corresponding PLMN-IdentityInfo, where b(j) is the number of PLMN-Identity entries in each PLMN-IdentityInfo, respectively. |

2. Type of UE

| Type of UE | Description |
| --- | --- |
| UE operating in SNPN access mode | Referred to as SNPN UE<br>Can access to NPN-only cell |
| UE not operating in SNPN access mode | |
| > UE not configured with allowed CAG list | Referred to as normal UE<br>Can access to shared cell or PN-only cell |
| > UE configured with allowed CAG list and with CAG-only indication | Referred to as CAG only UE<br>Can access to NPN-only cell |
| > UE configured with allowed CAG list but without CAG-only indication | Referred to as CAG also UE<br>Can access to shared cell or NPN-only cell |

3. UE Operation expected for each System

| | UE operating in SNPN Access Mode | UE not operating in SNPN Access Mode | | |
| --- | --- | --- | --- | --- |
| | SNPN UE | Normal UE | CAG only UE | CAG also UE |
| PLMN/SNPN Selection | SNPN selection | PLMN selection | PLMN selection | PLMN selection |
| Registered to | Selected SNPN | Selected PLMN | Selected PLMN | Selected PLMN |
| AS layer task for PLMN selection | Select SNPN identity from NPN-Identity InfoList | Select PLMN identity from PLMN-Identity InfoList | Select PLMN identity from NPN-Identity InfoList | NOTE* |
| Cell reselection to | NPN-only cell | shared cell or PN-only cell | NPN-only cell | NPN-only cell, shared cell or PN-only cell |
| TAC/CellIdentity Check | From NPN-Identity Info | From PLMN-Identity Info | From NPN-Identity Info | NOTE* |
| Access to | Access only to NPN-only cell | Access either to PN-only or shared cell | Access only to NPN-only cell | Access either to PN-only or shared cell* |

*For the CAG also UE, when a shared cell permits an access to both the normal UE and the CAG UE, it may be assumed that a CAG access is prioritized. That is, this may mean an operation of selecting a PLMN existing in an NPN list. (The motivation of CAG also UE would be to prioritize the CAG access if the shared cell provides both normal access and CAG access (i.e., select PLMN in NPN list when both lists contains selected PLMN).)

| 4. Content included in SIB1 according to Type of Cell | | | | |
|---|---|---|---|---|
| | PLMN-IdentityInfoList | NPN-IdentityInfoList | cellReservedFor OtherUse | cellReservedFor FutureUse |
| NPN-only Cell | Included** | Included | Included | Included or not included |
| Shared Cell | Included | Included | Not included | Included or not included |
| PN-only Cell | Included | Not included | Included or not included | N/A |

**In the NPN-only cell, PLMN-IdentityInfoList is unnecessary, but exists because the corresponding field is mandatory signaling.

| 5. Cell Type Indication Method and Access Limitation | | | | | |
|---|---|---|---|---|---|
| | SNPN UE | Normal UE | CAG only | CAG also | Cell Type Indication Method |
| NPN-only Cell | | Barred | | | Provide NPN-IdentityInfoList to SIB1 and set cellReservedForOtherUse to TRUE |
| Shared Cell | | | | | Provide NPN-Identity InfoList |
| PN-only Cell | Barred | | Barred | | Does not provide NPN-Identity InfoList |

FIG. 1H is a diagram illustrating a UE operation in which a UE accesses an NPN cell, according to an embodiment of the disclosure. Specifically, a UE operation according to processes of a regular access, an access to a PNI-NPN, and an access to an SNPN of a UE according to the above-described embodiments are proposed.

In operation 1h-05, the UE performs cell selection/re-selection, and may perform a cell selection process to camp-on to a suitable cell to which a selected PLMN belongs, by receiving/obtaining at least MIB and SIB1. Specifically, this may be determined through a CellAccess-RelatedInfo information element broadcast in SIB1. In operation 1h-10, the UE may perform an operation of identifying parameters included in the SIB1, particularly CellAccessRelatedInfo, and then storing parameters to be used to determine whether to use system information stored in another cell (determining validity of the system information). This corresponds to an operation of selecting and storing particular information included in the SIB1, and the stored parameters correspond to following values.

areaScope value: An indicator indicating whether system information is maintained in area units. The corresponding value has one value for each SIB and is set in an SIB-TypeInfo information element (IE) in si-SchedulingInfo. The UE stores the corresponding areaScope value indicated for each SIB.

PLMN-Identity: The UE stores first PLMN-Identity among a plurality of PLMN-identity values included in PLMN-IdentityInfoList.

NPN-Identity: The UE stores first NPN-Identity among a plurality of NPN-Identity values included in NPN-IdentityInfoList. (For reference, NPN-Identity indicates SNPN identity in the case of SNPN, and indicates PNI-NPN identity in the case of PNI-NPN.)

cellIdentity: The UE stores a cellIdentity value included in PLMN-IdentityInfoList including selected PLMN-Identity and NPN-Identity. That is, the UE stores a cellIdentity value included in first PLMN-IdentityInfo or NPN-IdentityInfo among a plurality of PLMN-identity values included in PLMN-IdentityInfoList.

systemInformationAreaID: This is one value stored in SIB1 and is applied to all SIBs broadcast in the corresponding cell. systemInformationAreaID is directly included in an SI-SchedulingInfo IE. The system information broadcast in the cell set to the corresponding value is a unique area ID in a PLMN, and same system information is applied to cells using a same area ID.

ValueTag: This is a parameter indicating whether system information has changed from a previously broadcasted value and is defined as a value between 0 and 31. The corresponding values are also set for each SIB and is included in an SIB-TypeInfo IE in si-SchedulingInfo, and the UE stores all values.

| What is stored | IE level/place/multiplicity |
|---|---|
| areaScope | One areaScope Per SIB, under SIB-TypeInfo under si-SchedulingInfo |
| PLMN-Identity | Multiple PLMN-identities in PLMN-IdentityInfoList |
| cellIdentity | Multiple cellIdentity in PLMN-IdentityInfoList |
| systemInformationAreaID | One systeminformationAreaID for all SIBs, under SI-SchedulingInfo |
| valueTag | One valueTag per SIB, under SIB-TypeInfo under si-SchedulingInfo |

The following ASN.1 code is added for structural description of fields and IEs in the disclosure and may be referred to.

```
CellAccessRelatedInfo ::=        SEQUENCE {
  plmn-IdentityList              PLMN-IdentityInfoList,
  cellReservedForOtherUse            ENUMERATED {true} OPTIONAL,        -- Need R.
  . . .,
  [[
  cellReservedForFutureUse-r16                ENUMERATED {true} OPTIONAL,     -- Need R
  npn-IdentityInfoList-r16           NPN-IdentityInfoList-r16     OPTIONAL     -- Need R
  ]]
}
```

```
NPN-IdentityInfoList-r16 ::=      SEQUENCE (SIZE (1..maxNPN-r16)) OF NPN-IdentityInfo-r16
NPN-IdentityInfo-r16 ::=          SEQUENCE {
  npn-IdentityList-r16               SEQUENCE (SIZE (1..maxNPN-(16)) OF NPN-Identity-r16,
  trackingAreaCode-r16               TrackingAreaCode,
  ranac-r16                        RAN-AreaCode                        OPTIONAL, -- Need R
  cellIdentity-r16                 CellIdentity,
  cellReservedForOperatorUse-r16        ENUMERATED (reserved, notReserved),
  . . .
}
```

```
NPN-Identity-r16 ::=             CHOICE {
  pni-npn-r16                        SEQUENCE {
    plmn-Identity-r16                    PLMN-Identity,
    cag-IdentityList-r16                 SEQUENCE (SIZE (1..maxNPN-r16)) OF CAG-Identity-r16
  },
  snpn-r16                             SEQUENCE {
    plmn-Identity                        PLMN-Identity,
    nid-List-r16                         SEQUENCE (SIZE (1..maxNPN-r16)) OF NID-r16
  }
}
CAG-Identity-r16 ::=             BIT STRING (SIZE (32))
NID-r16 ::=                      BIT STRING (SIZE (52))
```

```
PLMN-IdentityInfoList ::=        SEQUENCE (SIZE (1..maxPLMN)) OF PLMN-IdentityInfo
PLMN-IdentityInfo ::=            SEQUENCE {
  plmn-IdentityList:                 SEQUENCE (SIZE (1..maxPLMN)) OF PLMN-Identity,
  trackingAreaCode                 TrackingAreaCode                OPTIONAL, -- Need R
  ranac                            RAN-AreaCode                    OPTIONAL, -- Need R
  cellIdentity                     CellIdentity,
  cellReservedForOperatorUse       ENUMERATED {reserved, notReserved},
  . . .,
  [[
  iab-Support-r16                  ENUMERATED {true}               OPTIONAL -- Need R
  ]]
}
```

In operation 1h-15, the UE may select a first tracking area code (TAC), a first cell identity, and a first RAN area code (RANAC) associated with the selected PLMN and SNPN, and use the same later to verify the validity of system information and determine validity of the selected TAC cell and RANAC. In the disclosure, the UE operation is classified according to a network type and a UE type applied in this operation.

1. First condition: This corresponds to a PN-only cell, which is a cell that permits an access only to a normal UE. That is, this is a case in which NPN-IdentityInfoList is not included in cellAccessRelatedInfo of SIB1 of the corresponding cell.
   Method 1 below is applied when the first condition is satisfied.

2. Second condition: This corresponds to a shared cell, which is a cell that both the normal UE and the NPN UE are able to access.
   A. (2-1)-th condition: When a CAG-only UE accesses a corresponding cell
   Method 2 below is applied when the (2-1)-th condition is satisfied.
   B. (2-2)-th condition: When a CAG also UE and a normal UE access a corresponding cell
   Method 1 below is applied when the (2-2)-th condition is satisfied.
   C. (2-3)-th condition: When an NPN-only UE accesses a corresponding cell
   Method 2 below is applied when the (2-3)-th condition is satisfied.

3. Third condition: This corresponds to an NPN-only cell, which is a cell that only an NPN UE is able to access. That is, this is a case in which NPN-IdentityInfoList is included in cellAccessRelatedInfo of SIB1 of the corresponding cell and cellReservedForOtherUse is set to true.

Method 2 below is applied when the third condition is satisfied.

As listed above, the UE differently selects and applies the following parameters according to a network selection condition in the disclosure.

in a one-to-one manner. That is, the HRNN information mapped to the selected NPN may be transmitted to the NAS layer. A rule that when an n-th entry of an HRNN list is a certain value (for example, hx00) or has a certain size (1 byte or 0 byte), an HRNN of the n-th entry is the same as an HRNN of an (n–1)-th entry of the HRNN list may be applied. In this manner, signaling reduction may be obtained by reducing repetitive HRNN downloading.

```
SIB10-r16 ::=              SEQUENCE {
    hrnn-List-r16              HRNN-List-r16                         OPTIONAL, -- Need R
    lateNonCriticalExtension  OCTET STRING                          OPTIONAL,
    . . .
}
HRNN-List-r16 ::=          SEQUENCE (SIZE (1..maxNPN-r16)) OF HRNN-r16
HRNN-x16 ::=               SEQUENCE {
    hrnn-r16                  OCTET STRING (SIZE (1..maxHRNN-Len-r16))  OPTIONAL -- Need R
}
```

| SIB10 field descriptions |
| --- |
| HRNN-List |
| The same amount of HRNN elements as the number of NPNs in SIB 1 are included. The n-th entry of HRNN-List contains the human readable network name of the n-th NPN of SIB1. The corresponding entry in HRNN-List is absent if there is no HRNN associated with the given NPN. |

1. Method 1: The UE applies PLMN-IdentityInfo and uses related values in a subsequent procedure. In other words, in operation 1*h*-15, the UE selects, as the first TAC, the first RANAC, and the first cellIdentity, trackingAreaCode, ranac, and cellIdentity included in TA-IdentityList selected by using the selected first TAC and first cell identity. (in the remainder of the procedures use plmn-IdentityList, trackingAreaCode, ranac and cellIdentity for the cell as received in the corresponding PLMN-IdentityInfo containing the selected PLMN.)

2. Method 2: The UE applies NPN-IdentityInfo and uses related values in a subsequent procedure. In other words, trackingAreaCode, ranac, and cellIdentity included in npn-IdentityList are selected as the first TAC, the first RANAC, and the first cellIdentity. (in the remainder of the procedures use npn-Identity, trackingAreaCode, ranac and cellIdentity for the cell as received in the corresponding NPN-Identity-Info containing the selected NPN.)

In operation 1*h*-20, the UE may use the selected first TAC and first cell identity to perform an operation of identifying whether accesses to the selected TAC and cell are barred and identifying whether TA update is required. Operation 1*h*-20 is an operation of identifying whether the selected first TAC is present in a forbidden TA list by referring to information received from an NAS layer, and identifying whether the selected first cell identity is present in a forbidden cell list. Also, the UE compares whether the selected first TAC is included in a valid TA list and determines whether the TA update is required, based on whether the selected first TAC is included in the valid TAC.

In operation 1*h*-25, depending on whether the UE has selected SNPN or PLMN, when the selected PLMN is included in npn-IdentityInfoList, the UE transmits HRNN information received from SIB to the NAS layer so as to display, on a user screen, an HRNN associated with the selected PLMN. Here, the HRNN information may be transmitted through the following ASN.1 code, and is mapped to NPN identity included in the npn-IdentityInfoList In operation 1*h*-30, the UE may perform an operation of storing the system information for the corresponding cell, and the stored information corresponds to values used in operations 1*h*-10 to 1*h*-25. In particular, the UE stores the first cell identity satisfying the procedure as a second cell identity and uses the same to determine whether to use the system information stored in the other cell in the future/identify the validity.

In operation 1*h*-35, the UE determines whether to update TA and RNA through the stored first cell identity, first TAC, and first RANAC values, and performs the following operations when necessary. The determining of whether to perform the operations may be according to a result of operation 1*h*-20, and operation 1*h*-35 may be performed simultaneously with or before operation 1*h*-30.

When only TA update is required, TA update is performed.

When both TA update and RNA update are required, TA update is performed.

When only RNA update is required, RNA update is performed.

Figure 1I:
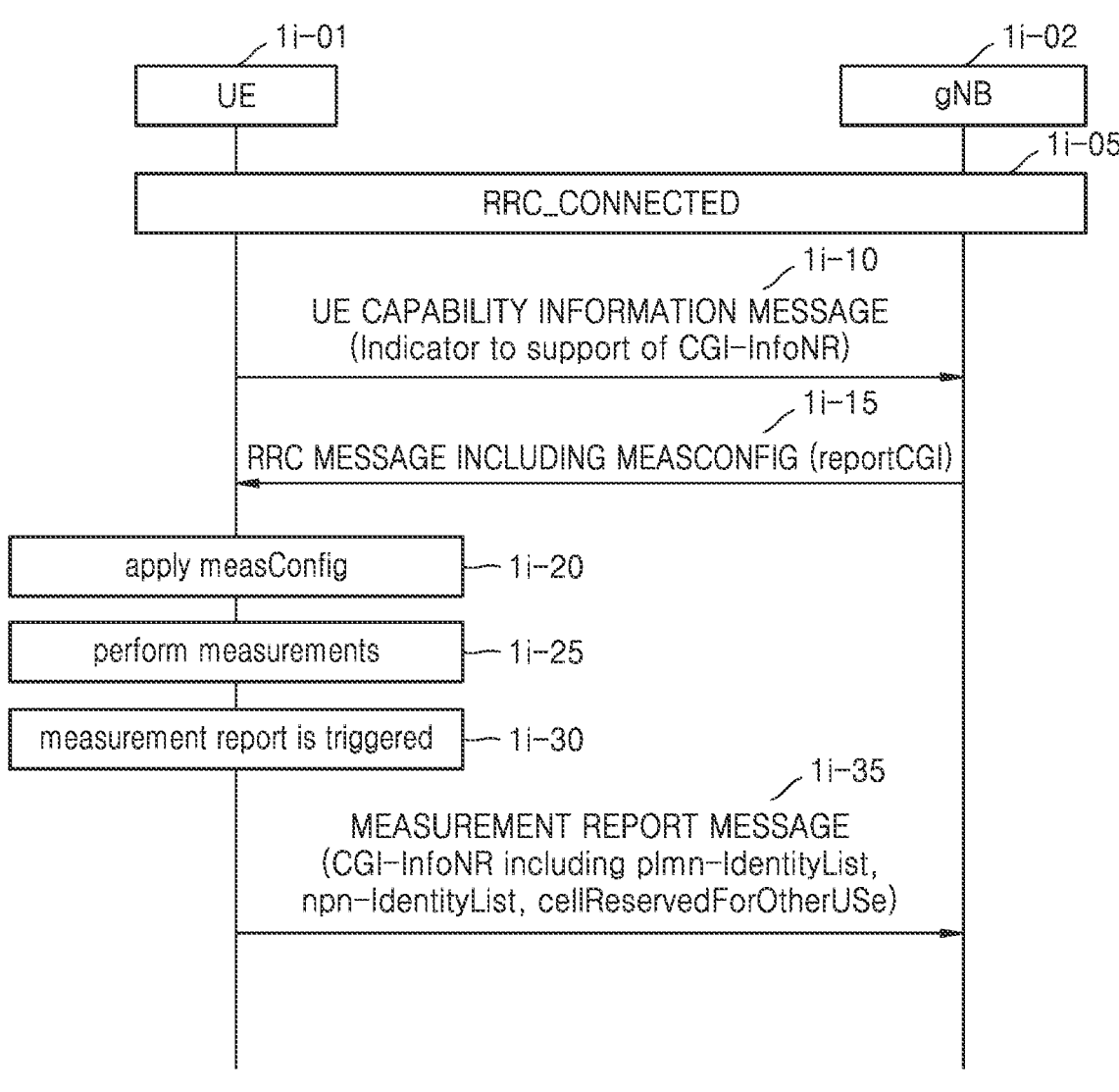
FIG. 1I is a diagram for describing a procedure, performed by a UE in an RRC connected mode (RRC_CONNECTED), of transmitting a measurement report message to a base station for an automatic neighbor relation, in a next-generation mobile communication system, according to an embodiment of the disclosure.

FIG. 1I is a diagram for describing a procedure, performed by a UE in an RRC connected mode (RRC_CONNECTED), of transmitting a measurement report message to a base station for an automatic neighbor relation, in a next-generation mobile communication system, according to an embodiment of the disclosure.

Referring to FIG. 1I, a UE 1*i*-01 may establish an RRC connection with a base station 1*i*-02 (e.g., gNB) and thus be in an RRC connected mode (RRC_CONNECTED) (operation 1*i*-05).

In operation 1*i*-10, the UE 1*i*-01 may transmit, to the base station 1*i*-02, a UE capability information message (UECapabilityInformation message) through a UE capability transfer procedure. The UE capability information message may include at least one of the followings in relation to whether an automatic neighbor relation (ANR) is supported.

Indicator indicating that CGI-InfoEUTRA reporting for E-UTRA is possible. The indicator may denote a separate indicator depending on a core type (for example, an EPC or 5GC).

Indicator indicating that CGI-InfoNR reporting for NR is possible. The indicator may denote a separate indicator depending on a UE type according to the above-described embodiment.

In operation 1*i*-15, the base station 1*i*-02 may transmit, to the UE 1*i*-01, an RRC message including measurement configuration information (MeasConfig). For example, the RRC message may be an RRC connection reconfiguration message (RRCReconfiguration message). The measurement configuration information may include at least one of the followings.

measObjectToAddModList measObjectToAddModList may include a MeasObject-ToAddModList IE.

The MeasObjectToAddModList IE may include one or more MeasObjectToAddMod.

Each MeasObjectToAddMod may include measObjectId, and include measObject corresponding to measObjectId.

The measObject may include one of a measurement object (i.e., measObjectNR) for NR and a measurement object (i.e., measObjectEUTRA) for EUTRA.

reportConfigToAddModList reportConfigToAddModList may include a ReportConfigToAddModList IE.

The ReportConfigToAddModList IE may include one or more ReportConfigToAddMod.

Each ReportConfigToAddMod may include ReportConfigId, and may include reporting configuration information (reportConfig) corresponding to ReportConfigId.

The reportConfig may include one of reporting configuration (i.e., reportConfigNR) for NR and reporting configuration (i.e., reportConfigInterRAT) for Inter-RAT.

In the present embodiment, the reportConfigNR may include at least one ReportConfigId in which report-Type is set to reportCGI. The reportCGI may include reportCGI, and the reportCGI may be configured with at least one of an indicator (cellForWhichToReport-CGI) indicating a cell to which one or more CGIs are to be reported or a useAutonomousGaps indicator. Specifically, cellForWhichToReportCGI may include one or more PhysCellID (or PhysCellIdRange), and the useAutonomousGaps indicator is an indicator indicating whether a UE is able to obtain system information for an NR neighbor cell by using autonomous gaps.

measIdToAddModList measIdToAddModList may include a MeasIdToAddMod-List IE.

The MeasIdToAddModList IE may include one or more MeasIdToAddMod.

Each MeasIdToAddMod may include measId, and include measObjectId and reportConfigId corresponding to measId.

In operation 1*i*-20, the UE 1*i*-01 may apply the measurement configuration information received from the base station 1*i*-02. For example, when reportType is configured to reportCGI in reportConfig associated with particular measId, (if the reportType is set to reportCGI in the report-Config associated with this measId), the UE 1*i*-01 may differently configure a value of a T321 timer and drive the T321 timer depending on which RAT (E-UTRA or NR) is considered by measObject associated with the measId, when NR is considered, which frequency band (FR1 or FR2) is considered, and whether reportConfig associated with the measId includes useAutonomousGaps.

In operation 1*i*-25, the UE 1*i*-01 may perform measurement by applying the measurement configuration information received in operation 1*i*-20.

In operation 1*i*-30, the UE 1*i*-01 may determine whether measurement reporting is triggered. For example, in the case where reportConfig in which reportType is set to reportCGI is included for each measId included in measIdList belonging to VarMeasConfig, when a cell having a physical cell identity matching a value of cellForWhichToReportCGI included in reportConfig belonging to VarMeasConfig is detected in associated measObject, the UE 1*i*-01 may consider that the cell is applicable to measurement reporting triggering (consider the cell detected on the associated measObject which a physical cell identity matching the value of the cellForWhichToReportCGI included in the corresponding reportConfig within the VarMeasConfig to be applicable). In the case where reportType is set to reportCGI, when SIB1 is obtained for a requested cell or it is detected that SIB1 is not transmitted in the requested cell, the UE 1*i*-01 may stop the T321 timer. Then, the UE 1*i*-01 may include a measurement report entry in VarMeasReportList for measId, set numberOfReportsSent defined in VarMeasReportList to 0, and perform a measurement reporting procedure. When the T321 timer expires for measId, the UE 1*i*-01 may include the measurement report entry in VarMeasReportList for measId, set numberOfReportsSent defined in VarMeasReportList to 0, and perform the measurement reporting procedure.

In operation 1*i*-35, the UE 1*i*-01 may transmit, to the base station 1*i*-02, a measurement report message (MeasurementReport message). The UE 1*i*-01 may configure measResult in the measurement report message for each measId in which the measurement reporting procedure is triggered. For example, a measurement identity that triggered measurement reporting may be set to measId. In a case where there is at least one available neighbor cell to be reported (if there is at least one applicable neighboring cell to report), when a cell indicated by cellForWhichReportCGI is an NR cell, the UE 1*i*-01 may perform the following operation to transmit the measurement report message to the base station 1*i*-02.

When plmn-IdentityInfoList of cgi-info is obtained from the NR cell indicated by cellForWhichReportCGI (if plmn-IdentityInfoList of the cgi-Info for the concerned cell has been obtained), plmn-IdentityInfoList including plmn-IdentityList, tracking AreaCode (if possible), ranac (if possible), cellIdentity, and cellReservedForOperatorUse for each entry of plmn-IdentityInfoList, and frequency Bandlist (if possible) may be included in the measurement report message (i.e., contained in cgi-InfoNR).

When npn-IdentityInfoList of cgi-info is obtained from the NR cell indicated by cellForWhichReportCGI, npn-IdentityInfoList including npn-IdentityList, trackingAreaCode (if possible), ranac (if possible), cellIdentity, and cellReservedForOperatorUse for each entry of npn-IdentityList, and cellReservedForOtherUse (if possible) or frequencyBandlist (if possible) may be included in the measurement report message (i.e., contained in cgi-InfoNR).

When the NR cell indicated by cellForWhichReportCGI indicates that SIB1 is not broadcasted through MIB, the UE 1*i*-01 may include noSIB1 including ssb-SubCarrierOffset and pdcch-ConfigSIB1 obtained from the MIB in the measurement report message (i.e., contained in cgi-InfoNR).

The UE 1*i*-01 according to the present embodiment includes cellReservedForOtherUse in the CGI-InfoNR because a base station operation (for example, handover) may be assisted by reporting, to the base station 1*i*-02, a cell type of the indicated NR cell.

Figure 1J:
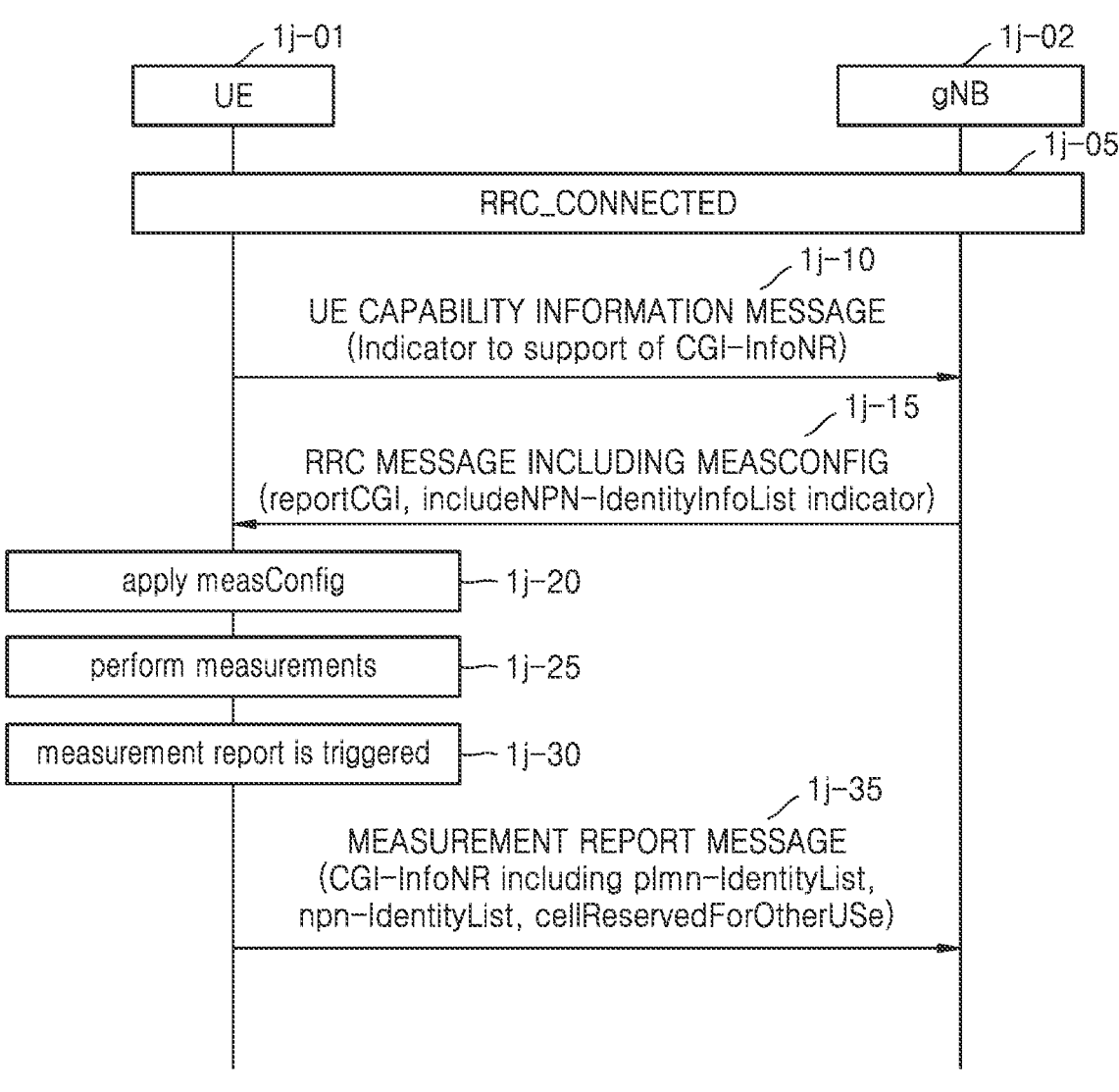
FIG. 1J is a diagram for describing a procedure, performed by a UE in an RRC connected mode (RRC_CONNECTED), of transmitting a measurement report message to a base station for an automatic neighbor relation, in a next-generation mobile communication system, according to an embodiment of the disclosure.

FIG. 1J is a diagram for describing a procedure, performed by a UE in an RRC connected mode (RRC_CONNECTED), of transmitting a measurement report message to a base station for an automatic neighbor relation, in a next-generation mobile communication system, according to an embodiment of the disclosure.

Referring to FIG. 1*j*, a UE 1*j*-01 may establish an RRC connection with a base station 1*j*-02 (e.g., gNB) and thus be in an RRC connected mode (RRC_CONNECTED) (operation 1*j*-05).

In operation 1*j*-10, the UE 1*j*-01 may transmit, to the base station 1*j*-02, a UE capability information message (UECapabilityInformation message) through a UE capability transfer procedure. The UE capability information message may include at least one of the followings in relation to whether an automatic neighbor relation (ANR) is supported.

Indicator indicating that CGI-InfoEUTRA reporting for E-UTRA is possible. The indicator may denote a separate indicator depending on a core type (for example, an EPC or 5GC).

Indicator indicating that CGI-InfoNR reporting for NR is possible. The indicator may denote a separate indicator depending on a UE type according to the above-described embodiment.

In operation 1*j*-15, the base station 1*j*-02 may transmit, to the UE 1*j*-01, an RRC message including measurement configuration information (MeasConfig). For example, the RRC message may be an RRC connection reconfiguration message (RRCReconfiguration message). The measurement configuration information may include at least one of the followings.

measObjectToAddModList measObjectToAddModList may include a MeasObjectToAddModList IE.

The MeasObjectToAddModList IE may include one or more MeasObjectToAddMod.

Each MeasObjectToAddMod may include measObjectId, and include measObject corresponding to measObjectId.

The measObject may include one of a measurement object (i.e., measObjectNR) for NR and a measurement object (i.e., measObjectEUTRA) for EUTRA.

reportConfigToAddModList reportConfigToAddModList may include a ReportConfigToAddModList IE.

The ReportConfigToAddModList IE may include one or more ReportConfigToAddMod.

Each ReportConfigToAddMod may include ReportConfigId, and may include reportConfig corresponding to ReportConfigId.

The reportConfig may include one of reporting configuration (i.e., reportConfigNR) for NR and reporting configuration (i.e., reportConfigInterRAT) for Inter-RAT.

In the present embodiment, the reportConfigNR may include at least one ReportConfigId in which reportType is set to reportCGI. reportCGI may include ReportCGI, and at least one of one or more cellForWhichToReportCGI, a useAutonomousGaps indicator, or an indicator indicating whether npn-IdentityInfoList is included (includeNPN-IdentityInfoList indicator) may be set in ReportCGI. Specifically, cellForWhichToReportCGI may include one or more PhysCellID (or PhysCellIdRange), and when the useAutonomousGaps indicator is set, the UE 1*j*-01 may obtain system information from an NR neighbor cell by using autonomous gaps, and when the indicator indicating whether npn-IdentityInfoList is included is set, an operation of including npn-IdentityListInfoList in the CGI-InfoNR may be performed.

measIdToAddModList measIdToAddModList may include a MeasIdToAddModList IE.

The MeasIdToAddModList IE may include one or more MeasIdToAddMod.

Each MeasIdToAddMod may include measId, and include measObjectId and reportConfigId corresponding to measId.

In operation 1*j*-20, the UE 1*j*-01 may apply the measurement configuration information received from the base station 1*j*-02. For example, when reportType is configured to reportCGI in reportConfig associated with particular measId, (if the reportType is set to reportCGI in the reportConfig associated with this measId), the UE 1*j*-01 may differently configure a value of a T321 timer and drive the T321 timer depending on which RAT (E-UTRA or NR) is considered by measObject associated with the measId, when NR is considered, which frequency band (FR1 or FR2) is considered, and whether reportConfig associated with the measId includes useAutonomousGaps.

In operation 1*j*-25, the UE 1*j*-01 may perform measurement by applying the measurement configuration information received in operation 1*j*-20.

In operation 1*j*-30, the UE 1*j*-01 may determine whether measurement reporting is triggered. For example, in the case where reportConfig in which reportType is set to reportCGI is included for each measId included in measIdList belonging to VarMeasConfig, when a cell having a physical cell identity matching a value of cellForWhichToReportCGI included in reportConfig belonging to VarMeasConfig is detected in associated measObject, the UE 1*j*-01 may consider that the cell is applicable to measurement reporting triggering (consider the cell detected on the associated measObject which a physical cell identity matching the value of the cellForWhichToReportCGI included in the corresponding reportConfig within the VarMeasConfig to be applicable). In the case where reportType is set to reportCGI, when SIB1 is obtained for a requested cell or it is detected that SIB1 is not transmitted in the requested cell, the UE 1*j*-01 may stop the T321 timer. Then, the UE 1*j*-01 may include a measurement report entry in VarMeasReportList for measId, set numberOfReportsSent defined in VarMeasReportList to 0, and perform a measurement reporting procedure. When the T321 timer expires for measId, the UE 1*j*-01 may include the measurement report entry in VarMeasReportList for measId, set numberOfReportsSent defined in VarMeasReportList to 0, and perform the measurement reporting procedure.

In operation 1*j*-35, the UE 1*j*-01 may transmit, to the base station 1*j*-02, a measurement report message (MeasurementReport message). The UE 1*j*-01 may configure measResult in the measurement report message for each measId in which the measurement reporting procedure is triggered. For example, a measurement identity that triggered measurement reporting may be set to measId. In a case where there is at least one available neighbor cell to be reported (if there is at least one applicable neighboring cell to report), when a cell indicated by cellForWhichReportCGI is an NR cell, the UE 1*j*-01 may perform the following operation to transmit the measurement report message to the base station 1*j*-02.

When plmn-IdentityInfoList of cgi-info is obtained from the NR cell indicated by cellForWhichReportCGI (if plmn-IdentityInfoList of the cgi-Info for the concerned cell has been obtained), plmn-IdentityInfoList including plmn-IdentityList, tracking AreaCode (if possible), ranac (if (possible), cellIdentity, and cellReservedFor-OperatorUse for each entry of plmn-IdentityInfoList, and frequency Bandlist (if possible) may be included in the measurement report message (i.e., contained in cgi-InfoNR).

When npn-IdentityInfoList of cgi-info is obtained from the NR cell indicated by cellForWhichReportCGI and the includeNPN-IdentityInfoList indicator is set, npn-IdentityInfoList including npn-IdentityList, track-ingAreaCode (if possible), ranac (if possible), cellIden-tity, and cellReservedForOperatorUse for each entry of npn-IdentityList, and cellReservedForOtherUse (if possible) or frequencyBandlist (if possible) may be included in the measurement report message (i.e., con-tained in cgi-InfoNR). Unlike the above-described embodiment, the UE 1*j*-01 according to an embodiment of the disclosure does not include npn-IdentityInfoList and cellReservedForOtherUse (if possible) or frequen-cyBandlist (if possible) in the cgi-InfoNR when the includeNPN-IdentityInfoList indicator is not set, when the includeNPN-IdentityInfoList indicator is set but npn-IdentityInfoList is not included in SIB1, or when the includeNPN-IdentityInfoList indicator is not set.

When the NR cell indicated by cellForWhichReportCGI indicates that SIB1 is not broadcasted through MIB, the UE 1*j*-01 may include noSIB1 including ssb-SubCar-rierOffset and pdcch-ConfigSIB1 obtained from the MIB in the measurement report message (i.e., con-tained in cgi-InfoNR).

The UE 1*j*-01 according to the present embodiment includes cellReservedForOtherUse in the CGI-Info because a base station operation (for example, handover) may be assisted by reporting, to the base station 1*j*-02, a cell type of the indicated NR cell.

Figure 1K:
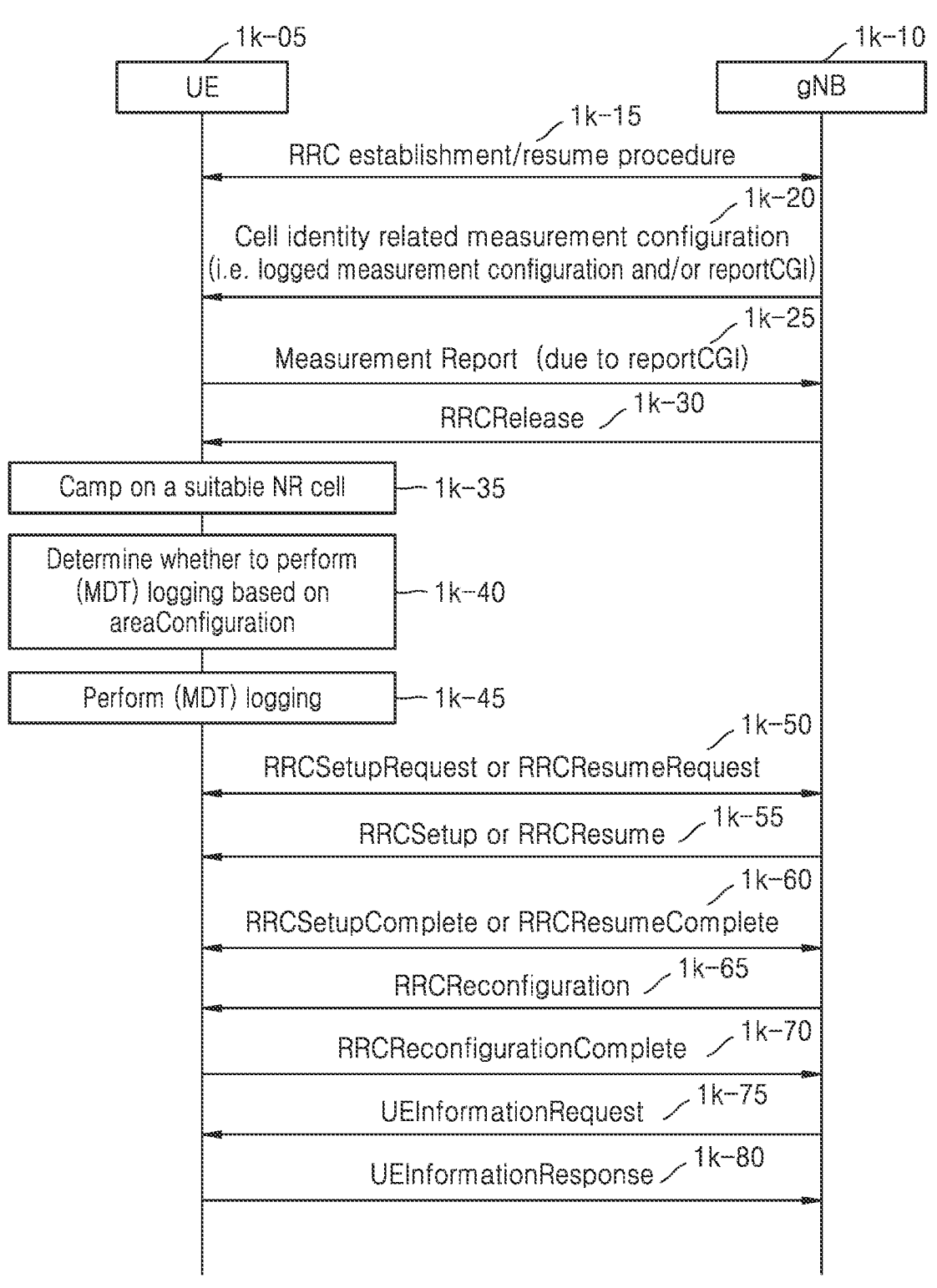
FIG. 1K is a flowchart of processes of collecting and reporting cell measurement information in a next-generation mobile communication system, according to an embodiment of the disclosure.

FIG. 1K is a flowchart of processes of collecting and reporting cell measurement information in a next-generation mobile communication system, according to an embodiment of the disclosure.

Referring to FIG. 1K, a UE 1*k*-05 may transition to an RRC connected mode (RRC_CONNECTED) from an RRC idle mode (RRC_IDLE) or RRC inactive mode (RRC_I-NACTIVE), through an RRC establishment or RRC resume procedure (operation 1*k*-15) with a base station 1*k*-10 (e.g., gNB). The base station 1*k*-10 may provide, to the UE 1*k*-05, measurement configuration information related to a cell identity, by using a predetermined RRC message (operation 1*k*-20). The measurement configuration information related to the cell identity may denote configuration information regarding the following two measurement types.

First type (ANR)

Second type (minimization of drive test (MDT))

The first type may include PhysCellID for each radio access technology. The second type may include at least one of loggingDuration, loggingInterval, or areaConfiguration. The areaConfiguration may be configured through one of at least following methods.

Method 1: One or more CellGlobalNR. The Cell-GlobalNR includes the first PLMN identity and a cell identity mapped thereto, in the first PLMN-IdentityInfo contained in SIB1.

Method 2: One or more tracking area codes.

Method 3: One or more tracking area identities. The tracking area identity may include plmn-Identity and tracking area code, and the plmn-Identity may be configured according to Method 1 above.

Method 4: A particular cell identity and npn-Identity may be included from information included in NPn-Identi-tyInfoList according to a cell type of the above-de-scribed embodiment. A method of configuring the specific cell identity and npn-Identity described in Method 4 may be limited as in Method 1 or may not be limited.

Method 5: One or more tracking area identities for NPN. The tracking area identity may include npn-Identity and tracking area code, and the npn-Identity may be con-figured according to Method 4 above.

In addition, the second type may include plmn-IdentityL-ist and/or npn-IdentityList.

When the measurement configuration information related to the cell identity of the first type is included in operation 1*k*-20, the UE 1*k*-05 may obtain plmn-IdentityInfoList in SIB1 of a neighbor cell corresponding to the indicated PhysCellID and report, to the base station 1*k*-10, a measure-ment result of a current serving cell and the plmn-Identity-InfoList of the neighbor cell as a predetermined RRC message, in operation 1*k*-25. When the npn-Identity InfoList is obtained in the SIB1, at least one of npn-IdentityInfoList or cellReservedForOtherUse may be reported to the base station 1*k*-10 as the predetermined RRC message, according to the above-described embodiment.

When the measurement configuration information related to the cell identity of the second type is included in operation 1*k*-20, the UE 1*k*-05 may store loggingDuration, log-gingInterval, and areaConfiguration in VarMeasConfig upon receiving the same. Also, when the plmn-IdentityList is included, one or more PLMNs included in the received plmn-IdentityList and a registered PLMN (RPLMN) may be set in VarLogMeasReport as plmn-IdentityList (set plmn-IdentityList in VarLogMeasReport to include the RPLMN as well as the PLMNs included in plmn-IdentityList). When the plmn-IdentityList is not included, the RPLMN may be set in the VarLogMeasReport as the plmn-IdentityList (set plmn-IdentityList in VarLogMeasReport to include the RPLMN). Alternatively, when the npn-IdentityList is included, the RPLMN or registered SNPN and one or more NPN-Identity included in the received npn-IdentityList may be set in the VarLogMeasReport as the npn-IdentityList. When the npn-IdentityList is not included, the RPLMN or registered SNPN may be set in the VarLogMeasReport as the npn-IdentityL-ist. Also, when the loggingDuration is received, a value thereof may be used to drive a T330 timer.

In operation 1*k*-30, the base station 1*k*-10 may transmit, to the UE 1*k*-05 in the RRC connected mode, an RRC con-nection release message (RRCRelease). Here, the UE 1*k*-05 may transition to the RRC inactive mode (RRC_INAC-TIVE) or RRC idle mode (RRC_IDLE), depending on whether the received RRC connection release message includes suspend configuration information (suspendCon-fig). For example, when the RRC connection release mes-sage including the suspend configuration information is successfully received, the UE 1*k*-05 in the RRC connected mode may transition to the RRC inactive mode. On the other hand, when the RRC connection release message not includ-ing the suspend configuration information is successfully received, the UE 1*k*-05 in the RRC connected mode may transition to the RRC idle mode.

In operation 1*k*-35, the UE 1*k*-05 that transitioned to the RRC idle mode or RRC inactive mode may camp-on to a suitable NR cell by performing a cell selection process. When the UE 1k-05 camps-on to a suitable cell, the UE 1k-05 may be in a camped normally state, and regard the camped-on cell as a serving cell. Even when the suitable cell is re-selected in the camped normally state, the suitable cell may be regarded as a serving cell.

In operation 1k-40, the UE 1k-05 in the camped normally state may perform logging when there is the plmn-IdentityList in which the RPLMN is stored in the VarLogMeasReport and the current serving cell belongs to the areaConfiguration. Alternatively, in operation 1k-40, the UE 1k-05 in the camped normally state may perform the logging when there is the npn-IdentityList in which the RPLMN is stored in the VarLogMeasReport and the current serving cell belongs to the areaConfiguration. Alternatively, in operation 1k-40, the UE 1k-05 in the camped normally state may perform the logging when there is the npn-IdentityList in which the registered SNPN is stored in the VarLogMeasReport and the current serving cell belongs to the areaConfiguration.

When it is determined to perform the logging in operation 1k-40, the UE 1k-05 may perform the logging in operation 1k-45. In other words, the logging may be performed periodically according to the loggingInterval. Also, the UE 1k-05 may log a global cell identity of the currently camped-on cell to servCellIdentity. The servCellIdentity may denote the first PLMN identity and the cell identity mapped thereto in the first PLMN-IdentityInfo contained in the SIB1 or may denote the first npn-Identity and the cell identity mapped thereto in the npn-IdentityInfoList. If possible, the UE 1k-05 may also perform logging on a measurement value of the neighbor cell. Also, if possible, the UE 1k-05 may perform, from the current cell, logging on the cellReservedForOtherUse received from the SIB1.

The UE 1k-05 may transmit, to the base station 1k-10, an RRCSetupRequest or RRCResumeRequest message so as to transition to a connected mode from an idle mode or inactive mode (operation 1k-50). The UE 1k-05 receives, from the base station 1k-10, an RRCSetup or RRCResume message as a response to the RRCSetupRequest or RRCResumeRequest message (operation 1k-55). The UE 1k-05 transmits, to the base station 1k-10, an RRCSetupComplete or RRCResumeComplete message (operation 1k-60). The RRCSetupComplete or RRCResumeComplete message may include an indicator (availability indicator) indicating that there is a result value of the logging.

The base station 1k-10 may transmit, to the UE 1k-05, an RRCReconfiguration message to reconfigure the RRC connection (operation 1k-65). The UE 1k-05 may transmit, to the base station 1k-10, an RRCReconfigurationComplete message as a response to the RRCReconfiguration message (operation 1k-70). The RRCReconfigurationComplete message may include an indicator (availability indicator) indicating that there is a result value of the logging.

The base station 1k-10 may request retrieval of the stored information by using a UEInformationRequest message, based on the availability indicator (operation 1k-75). Upon receiving the UEInformationRequest message, the UE 1k-05 may use a UEInformationResponse message to report, to the base station 1k-10, information (logsMeasReport) stored in the UE 1k-05 (operation 1k-80).

Figure 1L:
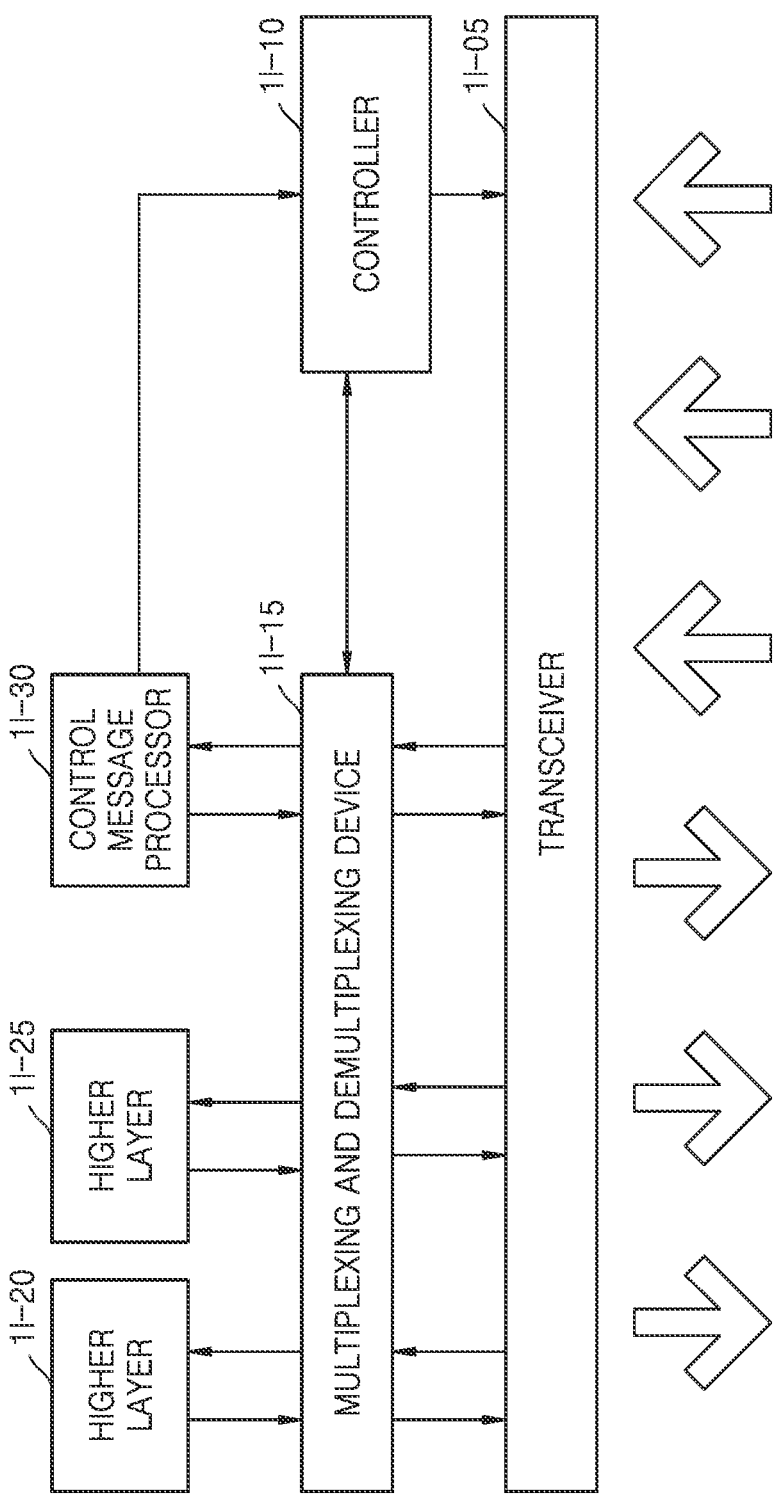
FIG. 1L is a block diagram of a configuration of a terminal, according to an embodiment of the disclosure.

FIG. 1L is a block diagram of a configuration of a terminal, according to an embodiment of the disclosure.

As shown in FIG. 1L, the terminal according to an embodiment of the disclosure includes a transceiver 1l-05, a controller 1l-10, a multiplexer and inverse-multiplexer (or multiplexing and demultiplexing device) 1l-15, various higher layer processors (or higher layers) 1l-20 and 1l-25, and a control message processor 1l-30.

The transceiver 1l-05 receives data and a certain control signal through a forward channel of a serving cell, and transmits the data and the certain control signal through a reverse channel. When a plurality of serving cells are configured, the transceiver 1l-05 performs data transmission and reception and control signal transmission and reception through the plurality of serving cells. The multiplexer and demultiplexer 1l-15 multiplexes data generated by the higher layer processors 1l-20 and 1l-25 or the control message processor 1l-30, or demultiplexes data received from the transceiver 1l-05, and transmits the multiplexed data or the demultiplexed data to the appropriate higher layer processor 1l-20 or 1l-25 or the control message processor 1l-30. The control message processor 1l-30 performs a necessary operation by transmitting and receiving a control message to/from a base station. The necessary operation includes a function of processing a control message such as a MAC control element (CE) and includes reporting of CBR measurement values and receiving of an RRC message for a resource pool and terminal operation. The higher layer processors 1l-20 and 1l-25 denote DRB devices and may be configured for each service. Data generated in a user service, such as a file transfer protocol (FTP) or a voice over Internet protocol (VOIP), is processed and transmitted to the multiplexer and demultiplexer 1l-15, or data transmitted from the multiplexer and demultiplexer 1l-15 is processed and transmitted to a service application of a higher layer.

The controller 1l-10 controls the transceiver 1l-05 and the multiplexer and demultiplexer 1l-15 such that inverse transmission is performed with suitable transmission resources at a suitable time point, by identifying a scheduling command received through the transceiver 1l-05, for example, inverse grants. The terminal has been described as including a plurality of blocks, wherein the blocks perform different functions, but this is only an embodiment and is not limited thereto. For example, functions performed by the multiplexer and demultiplexer 1l-15 may be performed by the controller 1l-10.

Figure 1M:
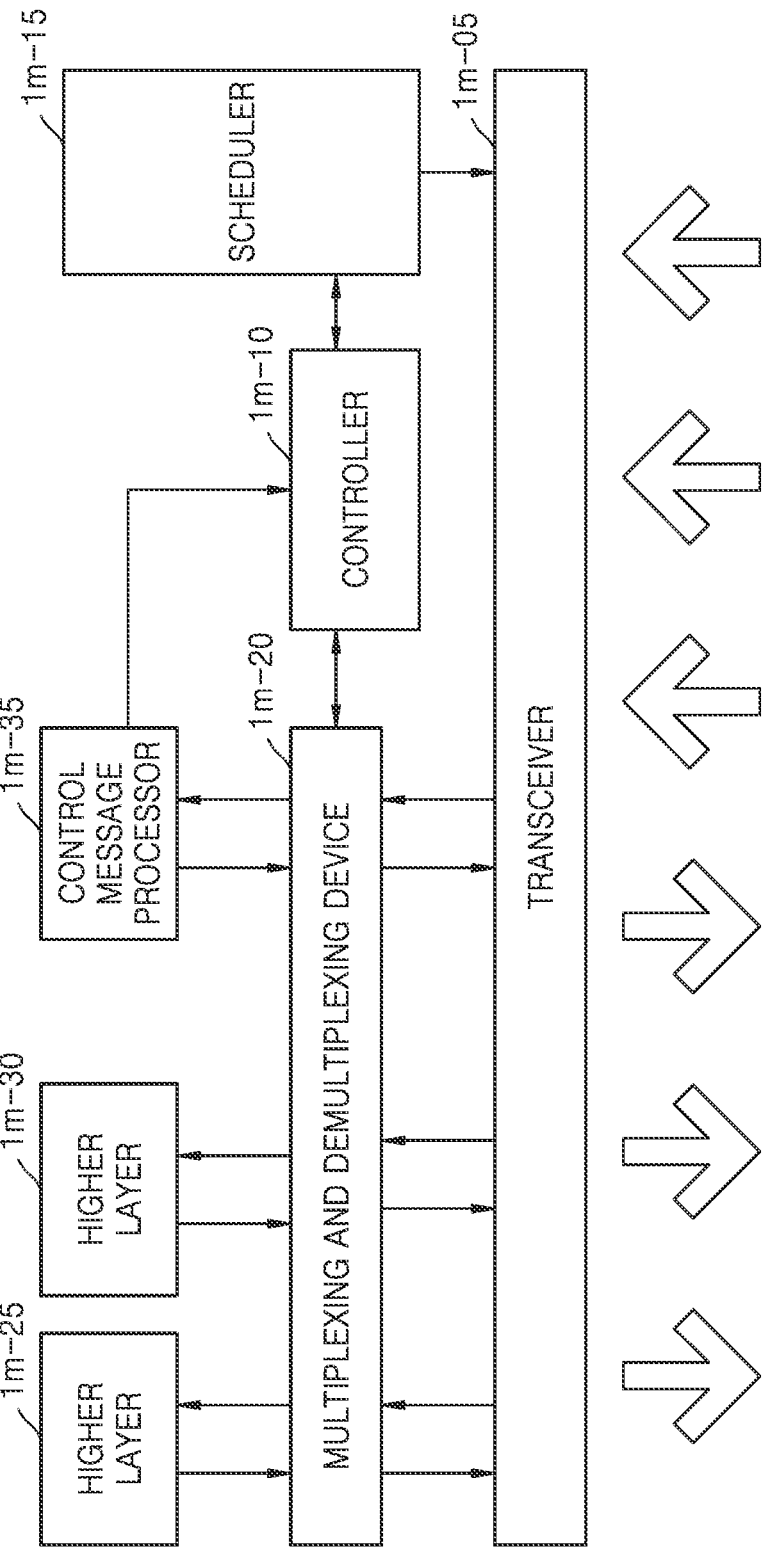
FIG. 1M is a block diagram of a configuration of a base station, according to an embodiment of the disclosure.

FIG. 1M is a block diagram of a configuration of a base station, according to an embodiment of the disclosure.

The base station of FIG. 1M includes a transceiver 1m-05, a controller 1m-10, a multiplexer and demultiplexer (or multiplexing and demultiplexing device) 1m-20, a control message processor 1m-35, various higher layer processors (or higher layers) 1m-25 and 1m-30, and a scheduler 1m-15.

The transceiver 1m-05 transmits data and a certain control signal through a forward carrier and receives data and a certain control signal through a reverse carrier. When a plurality of carriers are configured, the transceiver 1m-05 performs data transmission and reception and control signal transmission and reception through the plurality of carriers. The multiplexer and demultiplexer 1m-20 may multiplex data generated in the higher layer processors 1m-25 and 1m-30 or control message processor 1m-35, or demultiplex data received from the transceiver 1m-05 to transmit the data to the suitable higher layer processors 1m-25 and 1m-30, the control message processor 1m-35, or the controller 1m-10. The control message processor 1m-35 may generate a message to be transmitted to a terminal and transmit the message to a lower layer, based on control by the controller 1m-10. The higher layer processors 1m-25 and 1m-30 may be configured for each service of each terminal, and process data generated in a user service, such as FTP or VoIP, and transmit the same to the multiplexer and demultiplexer 1m-20, or process data transmitted from the multiplexer and demultiplexer 1m-20 and transmit the same to a service application of a higher layer.

The controller 1m-10 controls the transceiver 1m-05, scheduler 1m-15, multiplexer and demultiplexer 1m-20, and control message processor 1m-35. The scheduler 1m-15 assigns transmission resources to the terminal at an appropriate time point, considering buffer status of the terminal, channel status, and active time of the terminal, and processes signals transmitted by the terminal to the transceiver 1m-05, or transmits signals to the terminal.

Figure 1N:
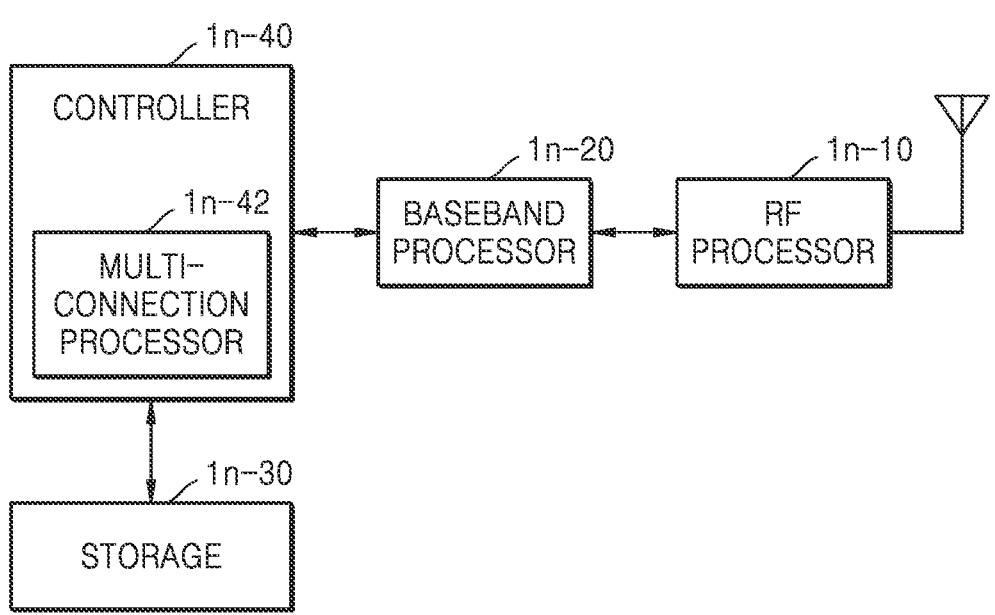
FIG. 1N is a block diagram of a configuration of a terminal, according to an embodiment of the disclosure.
Figure 10:
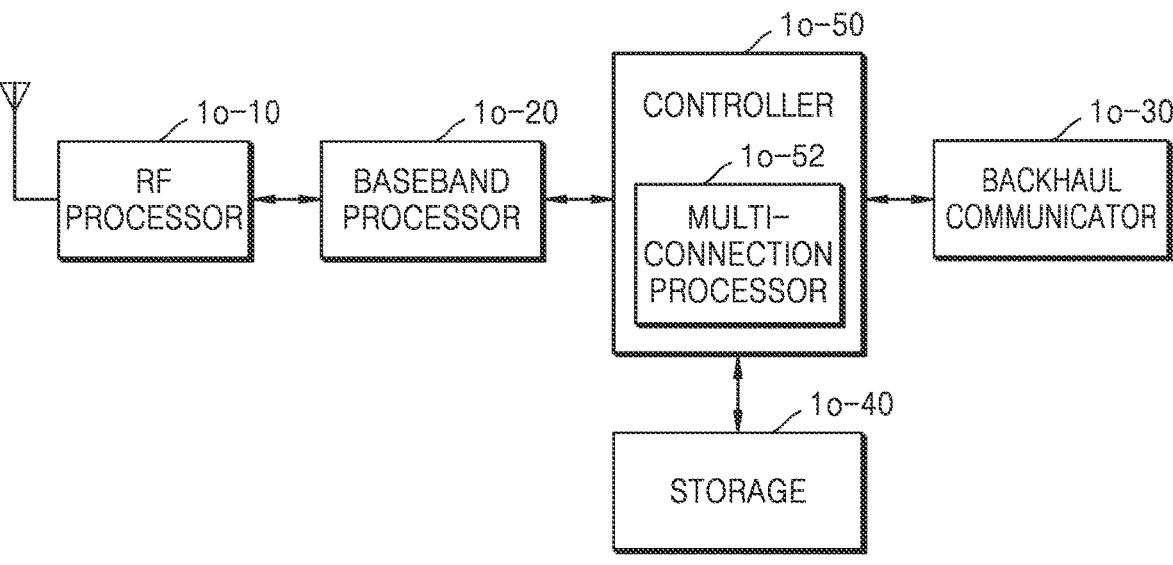

FIG. 1N is a block diagram of a configuration of a terminal, according to an embodiment of the disclosure.

Referring to FIG. 1N, the terminal includes a radio frequency (RF) processor 1n-10, a baseband processor 1n-20, a storage 1n-30, and a controller 1n-40. However, the configuration of the terminal is not limited to the example, and the terminal may include fewer elements or more elements than the elements illustrated in FIG. 1N. The terminal in FIG. 1N may correspond to the terminal of FIG. 1L.

The RF processor 1n-10 performs functions, such as signal-band conversion, amplification, etc., to transmit and receive signals on a radio channel. That is, the RF processor 1n-10 may up-convert a baseband signal provided from the baseband processor 1n-20 into an RF band signal and transmit the same through an antenna, and may down-convert an RF band signal received through the antenna into a baseband signal. For example, the RF processor 1n-10 may include a transmit filter, a receive filter, an amplifier, a mixer, an oscillator, a digital-to-analog converter (DAC), and an analog-to-digital converter (ADC). Although only a single antenna is illustrated in FIG. 1N, the terminal may include a plurality of antennas. The RF processor 1n-10 may include a plurality of RF chains. In addition, the RF processor 1n-10 may perform beamforming. For beamforming, the RF processor 1n-10 may adjust phases and magnitudes of signals transmitted and received through a plurality of antennas or antenna elements.

The baseband processor 1n-20 may perform a conversion function between a baseband signal and a bit string according to a physical layer standard of a system. For example, during data transmission, the baseband processor 1n-20 may generate complex symbols by encoding and modulating a transmit bit string. Also, during data reception, the baseband processor 1n-20 may reconstruct a received bit string by demodulating and decoding the baseband signal provided from the RF processor 1n-10. For example, according to an orthogonal frequency division multiplexing (OFDM) scheme, for data transmission, the baseband processor 1n-20 generates complex symbols by encoding and modulating a transmit bit string, maps the complex symbols to subcarriers, and then configures OFDM symbols by performing inverse fast Fourier transformation (IFFT) and cyclic prefix (CP) insertion. For data reception, the baseband processor 1n-20 may split a baseband signal provided from the RF processor 1n-10, in OFDM symbol units, reconstruct signals mapped to subcarriers by performing fast Fourier transformation (FFT), and then reconstruct a received bit string by demodulating and decoding the signals.

The baseband processor 1n-20 and the RF processor 1n-10 transmit and receive signals as described above. Accordingly, the baseband processor 1n-20 and the RF processor 1n-10 may be referred to as a transmitter, a receiver, a transceiver, or a communicator. Also, at least one of the baseband processor 1n-20 or the RF processor 1n-10 may include a plurality of communication modules to process signals of different frequency bands. The different frequency bands may include a super-high frequency (SHF) (e.g., 2.5 GHz and 5 GHZ) band and a millimeter wave (mm Wave) (e.g., 60 GHz) band. The terminal may transmit or receive a signal to or from a base station by using the baseband processor 1n-20 and the RF processor 1n-10, and the signal may include control information and data.

The storage 1n-30 may store data for operation of the terminal, e.g., basic programs, application programs, and configuration information. The storage 1n-30 may include a storage medium, such as read-only memory (ROM), random-access memory (RAM), a hard disk, CD-ROM, or DVD, or a combination thereof. Also, the storage 1n-30 may be configured in a plurality of memories. According to an embodiment of the disclosure, the storage 1n-30 may store a program for a method for the terminal of the disclosure to apply HARQ to a multicast broadcast service.

The controller 1n-40 may control overall operations of the terminal. For example, the controller 1n-40 may transmit and receive signals through the baseband processor 1n-20 and the RF processor 1n-10. The controller 1n-40 may record and read data on and from the storage 1n-30. In this regard, the controller 1n-40 may include at least one processor. For example, the controller 1n-40 may include a communication processor (CP) for controlling communications and an application processor (AP) for controlling a higher layer such as an application program. Also, at least one component in the terminal may be implemented as a chip. According to an embodiment of the disclosure, the controller 1n-40 may include a multi-connection processor 1n-42 that performs a process for operation in a multi-connection mode. For example, the controller 1n-40 may control the terminal to perform the procedure shown in the operations of FIG. 1F.

FIG. 1O is a block diagram of a configuration of a base station, according to an embodiment of the disclosure.

Referring to FIG. 1O, the base station may include an RF processor 1o-10, a baseband processor 1o-20, a storage 1o-30, and a controller 1o-40. However, the configuration of the base station is not limited to the example, and the base station may include fewer elements or more elements than the elements illustrated in FIG. 1O. The base station of FIG. 1O may correspond to the base station of FIG. 1M.

The RF processor 1o-10 performs functions, such as signal-band conversion, amplification, etc., to transmit and receive signals on a radio channel. That is, the RF processor 1o-10 may up-convert a baseband signal provided from the baseband processor 1o-20 into an RF band signal and transmit the same through an antenna, and may down-convert an RF band signal received through the antenna into a baseband signal. For example, the RF processor 1o-10 may include a transmit filter, a receive filter, an amplifier, a mixer, an oscillator, a digital-to-analog converter (DAC), and an analog-to-digital converter (ADC). Although only a single antenna is illustrated in FIG. 1O, the base station may include a plurality of antennas. The RF processor 1o-10 may include a plurality of RF chains. In addition, the RF processor 1o-10 may perform beamforming. For beamforming, the RF processor 1o-10 may adjust phases and magnitudes of signals transmitted and received through a plurality of antennas or antenna elements.

The baseband processor 1o-20 may perform a conversion function between a baseband signal and a bit string according to a physical layer standard of a system. For example, during data transmission, the baseband processor 1o-20 may generate complex symbols by encoding and modulating a transmit bit string. Also, during data reception, the baseband processor 1o-20 may reconstruct a received bit string by demodulating and decoding the baseband signal provided from the RF processor 1o-10. For example, according to an orthogonal frequency division multiplexing (OFDM) scheme, for data transmission, the baseband processor 1o-20 generates complex symbols by encoding and modulating a transmit bit string, maps the complex symbols to subcarriers, and then configures OFDM symbols by performing inverse fast Fourier transformation (IFFT) and cyclic prefix (CP) insertion. For data reception, the baseband processor 1o-20 may split a baseband signal provided from the RF processor 1o-10, in OFDM symbol units, reconstruct signals mapped to subcarriers by performing fast Fourier transformation (FFT), and then reconstruct a received bit string by demodulating and decoding the signals.

The baseband processor 1o-20 and the RF processor 1o-10 transmit and receive signals as described above. Accordingly, the baseband processor 1o-20 and the RF processor 1o-10 may be referred to as a transmitter, a receiver, a transceiver, or a communicator. Also, at least one of the baseband processor 1o-20 or the RF processor 1o-10 may include a plurality of communication modules to process signals of different frequency bands. The different frequency bands may include a super-high frequency (SHF) (e.g., 2.5 GHz and 5 GHZ) band and a millimeter wave (mm Wave) (e.g., 60 GHz) band. The base station may transmit or receive a signal to or from a terminal by using the baseband processor 1o-20 and the RF processor 1o-10, and the signal may include control information and data.

The storage 1o-30 may store data for operation of the base station, e.g., basic programs, application programs, and configuration information. The storage 1o-30 may include a storage medium, such as read-only memory (ROM), random-access memory (RAM), a hard disk, CD-ROM, or DVD, or a combination thereof. Also, the storage 1o-30 may be configured in a plurality of memories. According to an embodiment of the disclosure, the storage 1o-30 may store a program for a method for the base station of the disclosure to apply HARQ to a multicast broadcast service.

The controller 1o-40 may control overall operations of the base station. For example, the controller 1o-40 may transmit and receive signals through the baseband processor 1o-20 and the RF processor 1o-10. The controller 1o-40 may record and read data on and from the storage 1o-30. In this regard, the controller 1o-40 may include at least one processor. For example, the controller 1o-40 may include a communication processor (CP) for controlling communications and an application processor (AP) for controlling a higher layer such as an application program. Also, at least one component in the base station may be implemented as a chip. According to an embodiment of the disclosure, the controller 1o-40 may include a multi-connection processor 1o-42 that performs a process for operation in a multi-connection mode. For example, the controller 1o-40 may control the base station to perform procedure according to operations of the base station corresponding to the operations of UE shown in FIG. 1F.

The methods according to the embodiments of the disclosure described in the claims or the detailed description of the disclosure may be implemented in hardware, software, or a combination of hardware and software.

When implemented in software, a computer-readable storage medium storing one or more programs (e.g., software modules) may be provided. The one or more programs stored in the computer-readable storage medium are configured for execution by one or more processors in an electronic device. The one or more programs include instructions directing the electronic device to execute the methods according to the embodiments of the disclosure as described in the claims and the specification.

The programs (e.g., software modules or software) may be stored in random access memory (RAM), non-volatile memory including flash memory, read-only memory (ROM), electrically erasable programmable read-only memory (EEPROM), a magnetic disc storage device, compact disc-ROM (CD-ROM), a digital versatile disc (DVD), another type of optical storage device, or a magnetic cassette. Alternatively, the programs may be stored in memory including a combination of some or all of the above-mentioned storage media. A plurality of such memories may be included.

The programs may also be stored in an attachable storage device which is accessible through a communication network such as the Internet, an intranet, a local area network (LAN), a wide area network (WAN), or a storage area network (SAN), or a combination thereof. Such a storage device may access the electronic device via an external port. Furthermore, an additional storage device on the communication network may access an apparatus that performs embodiments of the disclosure.

In the afore-described embodiments of the disclosure, elements included in the disclosure are expressed in a singular or plural form according to the embodiments. However, the singular or plural form is appropriately selected for convenience of explanation and the disclosure is not limited thereto. As such, an element expressed in a plural form may also be configured as a single element, and an element expressed in a singular form may also be configured as plural elements.

Meanwhile, specific embodiments have been described in the detailed description of the disclosure, but various modifications may be possible without departing from the scope of the disclosure. Therefore, the scope of the disclosure should not be limited to the embodiments described above, but should be determined not only by the scope of the following claims, but also by the equivalents of the claims.

The invention claimed is:

1. A method performed by a user equipment (UE) in a wireless communication system, the method comprising:
   transmitting, to a base station, UE capability information including a first indicator indicating that the UE supports reporting of cell global identifier (CGI) information associated with a non-public network (NPN);
   receiving, from the base station, measurement configuration information including report configuration information for a new radio (NR), wherein the report configuration information for the NR includes a second indicator indicating a cell to which CGI information is to be reported;
   obtaining, from a neighbouring cell, system information including an NPN identity information list, wherein the NPN identity information list includes an NPN identity list and cellReservedForOperatorUse; and
   transmitting, to the base station, a measurement report message including the NPN identity information list including the NPN identity list and the cellReservedForOperatorUse,
   wherein the measurement report message further includes cellReservedForOtherUse obtained from the neighbouring cell, and
   wherein the neighbouring cell is indicated by the second indicator.

2. The method of claim 1, wherein the NPN identity information list further includes at least one of a tracking area code, a radio access network (RAN) area code or a cell identity.

3. The method of claim 1, wherein the system information further includes the cellReservedForOtherUse.

4. The method of claim 1, wherein the neighbouring cell indicated by the second indicator is a NR cell.

5. The method of claim 1, wherein the UE supports the NPN and the neighbouring cell is an NPN only cell.

6. A method performed by a base station in a wireless communication system, the method comprising:

receiving, from a user equipment (UE), UE capability information including a first indicator indicating that the UE supports reporting of cell global identifier (CGI) information associated with a non-public network (NPN);

transmitting, to the UE, measurement configuration information including report configuration information for a new radio (NR), wherein the report configuration information for the NR includes a second indicator indicating a cell to which CGI information is to be reported; and in case that system information including an NPN identity information list is obtained at the UE from a neighbouring cell, receiving, from the UE, a measurement report message including the NPN identity information list including a NPN identity list and cellReservedForOperatorUse, wherein the measurement report message further includes cellReservedForOtherUse obtained from the neighbouring cell, and wherein the neighbouring cell is indicated by the second indicator.

7. The method of claim 6, wherein the NPN identity information list further includes at least one of a tracking area code, a radio access network (RAN) area code or a cell identity.

8. The method of claim 6, wherein the system information further includes the cellReservedForOtherUse.

9. The method of claim 6, wherein the neighbouring cell indicated by the second indicator is a NR cell.

10. The method of claim 6, wherein the NPN is supported at the UE and the neighbouring cell is an NPN only cell.

11. A user equipment (UE) in a wireless communication system, the UE comprising:

a transceiver; and at least one processor coupled with the transceiver and configured to:

transmit, to a base station, UE capability information including a first indicator indicating that the UE supports reporting of cell global identifier (CGI) information associated with a non-public network (NPN), receive, from the base station, measurement configuration information including report configuration information for a new radio (NR), wherein the report configuration information for the NR includes a second indicator indicating a cell to which CGI information is to be reported, obtain, from a neighbouring cell, system information including an NPN identity information list, wherein the NPN identity information list includes an NPN identity list and cellReservedForOperatorUse, and transmit, to the base station, a measurement report message including the NPN identity information list including the NPN identity list and the cellReservedForOperatorUse, wherein the measurement report message further includes cellReservedForOtherUse obtained from the neighbouring cell, and wherein the neighbouring cell is indicated by the second indicator.

12. A base station in a wireless communication system, the base station comprising:

a transceiver; and at least one processor coupled with the transceiver and configured to:

receive, from a user equipment (UE), UE capability information including a first indicator indicating that the UE supports reporting of cell global identifier (CGI) information associated with a non-public network (NPN), transmit, to the UE, measurement configuration information including report configuration information for a new radio (NR), wherein the report configuration information for the NR includes a second indicator indicating a cell to which CGI information is to be reported, and in case that system information including an NPN identity information list is obtained at the UE from a neighbouring cell cell, receive, from the UE, a measurement report message including the NPN identity information list including a NPN identity list and cellReservedForOperatorUse, wherein the measurement report message further includes cellReservedForOtherUse obtained from the neighbouring cell, and wherein the neighbouring cell is indicated by the second indicator.

13. The UE of claim 11, wherein the NPN identity information list further includes at least one of a tracking area code, a radio access network (RAN) area code or a cell identity.

14. The UE of claim 11, wherein the system information further includes the cellReservedForOtherUse.

15. The UE of claim 11, wherein the neighbouring cell indicated by the second indicator is a NR cell.

16. The UE of claim 11, wherein the UE supports the NPN and the neighbouring cell is an NPN only cell.

\* \* \* \* \*